(12) United States Patent
Li

(10) Patent No.: US 12,663,873 B2
(45) Date of Patent: Jun. 23, 2026

(54) GESTURE INSTRUCTION EXECUTION METHOD AND APPARATUS, SYSTEM, AND STORAGE MEDIUM

(71) Applicant: Yinwang Intelligent Technologies Co., Ltd., Shenzhen (CN)

(72) Inventor: Xueyang Li, Shenzhen (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/948,823

(22) Filed: Sep. 20, 2022

(65) Prior Publication Data

US 2023/0021260 A1     Jan. 19, 2023

Related U.S. Application Data

(63) Continuation of application No. PCT/CN2020/080486, filed on Mar. 20, 2020.

(51) Int. Cl.
*G06F 3/01* (2006.01)
*B60K 35/10* (2024.01)
*B60K 35/22* (2024.01)
*B60K 35/26* (2024.01)

(52) U.S. Cl.
CPC .............. *G06F 3/017* (2013.01); *B60K 35/10* (2024.01); *B60K 35/223* (2024.01); *B60K 35/26* (2024.01)

(58) Field of Classification Search
None
See application file for complete search history.

(56) References Cited

U.S. PATENT DOCUMENTS

| | | | |
|---|---|---|---|
| 10,386,992 B2 | 8/2019 | Shin et al. | |
| 10,891,921 B2* | 1/2021 | Mittal | ................... G06F 9/4406 |
| 2011/0078624 A1* | 3/2011 | Missig | ................... G06F 3/0488 |
| | | | 345/173 |
| 2011/0107272 A1 | 5/2011 | Aguilar | |

(Continued)

FOREIGN PATENT DOCUMENTS

| | | |
|---|---|---|
| CN | 102760078 A | 10/2012 |
| CN | 103412713 A | 11/2013 |

(Continued)

OTHER PUBLICATIONS

Office Action in Chinse Appln. No. 202080004891.1, dated Jun. 24, 2021, 13 pages (with English translation).

(Continued)

*Primary Examiner* — Andre L Matthews
(74) *Attorney, Agent, or Firm* — Fish & Richardson P.C.

(57)     ABSTRACT

This application provides a gesture instruction execution method, apparatus, and system, and a storage medium. One example method includes obtaining a plurality of gesture instructions acting on different areas of a target screen; obtaining an operation area on the target screen corresponding to each of the obtained plurality of gesture instructions; determining, based on the operation area on the target screen corresponding to each of the plurality of gesture instructions and screen ranges to which a plurality of applications on the target screen belong, a target application corresponding to each gesture instruction; and controlling, based on instruction content of each gesture instruction, the target application corresponding to each gesture instruction.

20 Claims, 13 Drawing Sheets

(56)                    References Cited

U.S. PATENT DOCUMENTS

| | | | | |
|---|---|---|---|---|
| 2012/0176322 | A1* | 7/2012 | Karmi | G06F 3/04883 |
| | | | | 345/173 |
| 2013/0120295 | A1 | 5/2013 | Kim et al. | |
| 2018/0157329 | A1* | 6/2018 | Salter | G06F 3/017 |
| 2019/0212915 | A1 | 7/2019 | Kim et al. | |
| 2020/0059500 | A1 | 2/2020 | Feldman et al. | |
| 2020/0067786 | A1* | 2/2020 | Ricci | G08G 1/16 |
| 2020/0150863 | A1* | 5/2020 | Kim | G06F 3/0481 |
| 2021/0191579 | A1* | 6/2021 | Li | G06F 9/451 |
| 2021/0191741 | A1* | 6/2021 | Li | G06F 3/017 |
| 2021/0303150 | A1* | 9/2021 | Huang | G06F 3/04817 |

FOREIGN PATENT DOCUMENTS

| | | |
|---|---|---|
| CN | 106020473 A | 10/2016 |
| CN | 106201241 A | 12/2016 |
| CN | 106502560 A | 3/2017 |
| CN | 109358927 A | 2/2019 |
| CN | 109445572 A | 3/2019 |
| EP | 2891951 A1 | 7/2015 |
| FR | 2920563 A1 | 3/2009 |
| IN | 104598100 A | 5/2015 |
| IN | 107450830 A | 12/2017 |

OTHER PUBLICATIONS

Extended European Search Report in European Appln No. 20925352. 5, dated Apr. 6, 2023, 7 pages.
International Search Report and Written Opinion in International Appln. No. PCT/CN2020/080486, mailed on Dec. 8, 2020, 15 pages (with English translation).
EP Communication Pursuant to Article 94(3) EPC in European Appln. No. 20925352.5, mailed on Mar. 5, 2026, 7 pages.

* cited by examiner

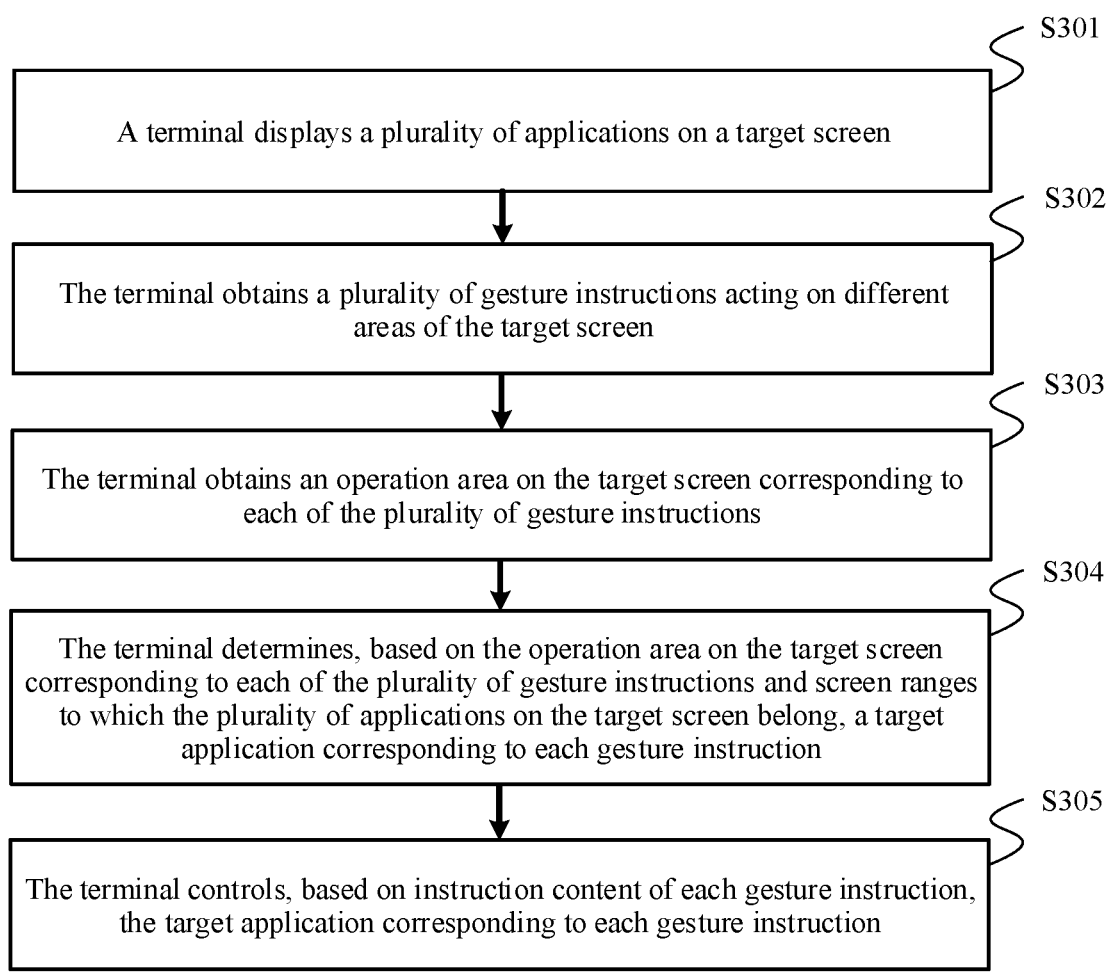

S301

A terminal displays a plurality of applications on a target screen

S302

The terminal obtains a plurality of gesture instructions acting on different areas of the target screen

S303

The terminal obtains an operation area on the target screen corresponding to each of the plurality of gesture instructions

S304

The terminal determines, based on the operation area on the target screen corresponding to each of the plurality of gesture instructions and screen ranges to which the plurality of applications on the target screen belong, a target application corresponding to each gesture instruction

S305

The terminal controls, based on instruction content of each gesture instruction, the target application corresponding to each gesture instruction

FIG. 3

GESTURE INSTRUCTION EXECUTION METHOD AND APPARATUS, SYSTEM, AND STORAGE MEDIUM

CROSS-REFERENCE TO RELATED APPLICATIONS

This application is a continuation of International Application No. PCT/CN2020/080486, filed on Mar. 20, 2020. The disclosure of which is hereby incorporated by reference in its entirety.

TECHNICAL FIELD

This application relates to the field of autonomous driving, and in particular, to a gesture instruction execution method and apparatus, a system, and a storage medium.

BACKGROUND

With development of the field of autonomous driving, screens are configured for many vehicles, and windows of applications can be displayed on the screens, so that users operate the applications through the windows of the applications.

For example, the screen is a central control screen of a control domain cockpit, and icons of an application A, an application B, and an application C may be displayed on the central control screen. After a driver taps the icon of the application A, a window of the application A is displayed on the central control screen in full screen. After the driver taps the window of the application A, the window of the application A becomes a focus window, and a window of the application B and a window of the application C are non-focus windows. Subsequently, only the application A responds to an operation of the driver, and the application B and the application C do not respond to the operation of the driver. In this case, if a front passenger wants to use the application B, the front passenger needs to perform a screen switching operation. The control domain cockpit responds to the screen switching operation, and switches a window displayed in full screen from the window of the application A to the window of the application B on the central control screen. In this case, the window of the application B becomes a focus window, and the window of the application A and the window of the application C are non-focus windows. Subsequently, only the application B responds to an operation of the front passenger.

In the foregoing method, the user can use only one application at a time. For example, in the foregoing example, only one of the driver and the front passenger can use one application, and the two users cannot use different applications at the same time. In view of this, a technical solution urgently needs to be proposed to meet a requirement that different applications can be used at the same time.

SUMMARY

Embodiments of this application provide a gesture instruction execution method and apparatus, a system, and a storage medium, to help support a plurality of users in using different applications at the same time. Technical solutions are as follows.

According to a first aspect, a gesture instruction execution method is provided. The method includes: obtaining a plurality of gesture instructions acting on different areas of a target screen; obtaining an operation area on the target screen corresponding to each of the obtained plurality of gesture instructions; determining, based on the operation area on the target screen corresponding to each of the plurality of gesture instructions and screen ranges to which a plurality of applications on the target screen belong, a target application corresponding to each gesture instruction; and controlling, based on instruction content of each gesture instruction, the target application corresponding to each gesture instruction.

The gesture instruction is usually an instruction triggered by a palm, a finger, a stylus, or the like. Optionally, the gesture instruction includes at least one of a touch gesture instruction or a hover gesture instruction. The touch gesture instruction is an instruction triggered by touching the target screen, and the touch gesture instruction may be obtained by using a touchscreen. For example, data (such as coordinates of a touch point, pressure of the touch point, and a touch area) of a touch event is collected by the touchscreen, and the data of the touch event is analyzed, to obtain the touch gesture instruction. The hover gesture instruction is an air gesture instruction executed above the target screen. The hover gesture instruction may be obtained by using a sensor (for example, a front-facing camera).

Optionally, in the foregoing method, all or some steps performed on each gesture instruction are performed at the same time.

For example, the obtaining a plurality of gesture instructions acting on different areas of a target screen is obtaining the plurality of gesture instructions that act on the different areas of the target screen at the same time.

For example, the controlling, based on instruction content of each gesture instruction, the target application corresponding to each gesture instruction is controlling, at the same time based on the instruction content of each gesture instruction, target applications respectively corresponding to the plurality of gesture instructions.

The concept of "at the same time" includes a plurality of cases. For example, "at the same time" means, two or more operations may be performed on a device at a same time point. For example, the obtaining the plurality of gesture instructions that act on the different areas of the target screen at the same time may include the following case: obtaining, at a time point 1, a gesture instruction 1 acting on a target screen area 1, and obtaining, at the time point 1, a gesture instruction 2 acting on the target screen area 1. For another example, the controlling, at the same time based on the instruction content of each gesture instruction, target applications respectively corresponding to the plurality of gesture instructions may include the following case: controlling a target application 1 at a time point 2 based on instruction content of a gesture instruction 1, controlling a target application 2 at the time point 2 based on instruction content of a gesture instruction 2, controlling a target application N at the time point 2 based on instruction content of a gesture instruction N, and so on. In this way, N applications: the target application 1 and the target application 2 to the target application N are controlled at the time point 2.

For another example, "at the same time" means that events occur successively within specific preset duration. For example, the obtaining the plurality of gesture instructions that act on the different areas of the target screen at the same time may include the following case: first, obtaining, at a time point 1, a gesture instruction 1 acting on an area 1 of the target screen, and then obtaining, at a time point 2, a gesture instruction 2 acting on an area 2 of the target screen, where time difference between the time point 2 and the time point 1 is less than a threshold. For another example, the controlling, at the same time based on the instruction content of each gesture instruction, target applications respectively corresponding to the plurality of gesture instructions may include the following case: controlling a target application 1 at a time point 1 based on instruction content of a gesture instruction 1, and controlling a target application 2 at a time point 2 based on instruction content of a gesture instruction 2, where a time difference between the time point 2 and the time point 1 is very short, and may be ignored, and a user perceives that the target application 1 and the target application 2 are controlled at the same time.

The foregoing provides a method for supporting a plurality of users in driving different applications at the same time. In a process in which the plurality of users use a same terminal, each user can trigger a gesture instruction for an application, so that a plurality of gesture instructions are obtained. An operation area on the target screen corresponding to each gesture instruction of the plurality of gesture instructions is compared with screen ranges to which the plurality of applications on the target screen belong, and a target application in a corresponding screen range is controlled based on each gesture instruction, so that each application responds to a gesture instruction of a corresponding user. In this way, interaction events of the plurality of users can be responded to at the same time, and each user can operate a preferred application without interfering with each other, so that the plurality of users can drive different applications at the same time.

Optionally, the method is applied to a control domain cockpit, the target screen is a central control screen of the control domain cockpit, and the different areas of the target screen include an area on a driver side of the central control screen and an area on a front passenger side of the central control screen.

In this optional manner, a plurality of applications are displayed on the central control screen of the control domain cockpit through a plurality of windows, and a driver and a front passenger can operate respective preferred applications at the same time. The control domain cockpit obtains a gesture instruction on the driver side and a gesture instruction on the front passenger side, and controls an application on the driver side and an application on the front passenger side based on a plurality of gesture instructions, so that both operation requests of the driver and the front passenger can be responded to. In this way, an operation of the driver and an operation of the front passenger do not interfere with each other. This meets a requirement that the driver and the front passenger use different applications at the same time, and supports a scenario in which a plurality of users such as the driver and the front passenger operate the central control screen of the control domain cockpit.

Optionally, the plurality of gesture instructions include a plurality of touch gesture instructions or a plurality of hover gesture instructions.

Optionally, a screen range to which each application of the plurality of applications belongs includes at least one of a range covered by an icon of the application or a window range of the application in an open state.

Optionally, the plurality of gesture instructions include gesture instructions from a plurality of users. For example, the plurality of gesture instructions include a gesture instruction from the driver and a gesture instruction from the front passenger. The gesture instructions of the plurality of users are, for example, touch gesture instructions of the plurality of users.

Optionally, the determining, based on the operation area on the target screen corresponding to each of the plurality of gesture instructions and screen ranges to which a plurality of applications on the target screen belong, a target application corresponding to each gesture instruction includes:

determining, based on the operation area on the target screen corresponding to each of the plurality of gesture instructions and the screen ranges to which the plurality of applications on the target screen belong, target applications respectively corresponding to the plurality of gesture instructions.

Optionally, the plurality of gesture instructions include a movement gesture instruction. In an application control process, a window of the target application is moved on the target screen based on the movement gesture instruction.

In this optional manner, the window of the application can be randomly moved on the target screen. The user can move the window of the application to a location at which the user can easily operate the application, and this facilitates use of the application by the user.

Optionally, the movement gesture instruction is a touch movement gesture instruction. In an application control process, a window of the target application is moved on the target screen based on the touch movement gesture instruction.

Optionally, the each gesture instruction includes a scaling gesture instruction. In an application control process, a window of the target application is scaled on the target screen based on the scaling gesture instruction.

In this optional manner, a window of each application can be randomly scaled, and the user can scale an application to a proper size. This meets a requirement of the user for adjusting a window size.

Optionally, the scaling gesture instruction is a touch scaling gesture instruction. In the application control process, the window of the target application is scaled on the target screen based on the touch scaling gesture instruction.

Optionally, the scaling gesture instruction includes a stretch gesture instruction triggered on a window border. In an application scaling process, the window of the target application is scaled up based on a stretch gesture instruction in a first direction, or the window of the target application is scaled down based on a stretch gesture instruction in a second direction, where the second direction is a reverse direction of the first direction.

Optionally, the stretch gesture instruction is a touch stretch gesture instruction. The window of the target application is scaled up based on a touch stretch gesture instruction in a first direction, or the window of the target application is scaled down based on a touch stretch gesture instruction in a second direction.

Optionally, a screen range to which each application of the plurality of applications belongs includes a window range of the application in an open state, and the window range of the application in the open state is a preconfigured window range.

In this optional manner, after being started, the application is automatically displayed based on the preconfigured window range. This meets a requirement of a developer for customizing the window range.

Optionally, a screen range to which each application of the plurality of applications belongs includes a window range of the application in an open state, and the window range of the application in the open state is a window range to which each application belongs when the application exits last time.

In this optional manner, after being started, the application is automatically displayed based on the window range to which the application belongs when the application exits last time. This ensures that the window range of the application is associated with a historical use behavior of the user, and helps ensure that the window range of the application matches a personal use habit of the user.

Optionally, a screen range to which each application of the plurality of applications belongs includes a window range of the application in an open state, and the method further includes: storing window ranges of the plurality of applications in the open state in a stack; and performing stack management on the window range of each of the plurality of applications in the open state by using the stack.

In this optional manner, the window range of each application can be managed in a unified manner by using the stack.

Optionally, the full-screen gesture instruction is a touch full-screen gesture instruction.

According to a second aspect, a gesture instruction execution apparatus is provided. The gesture instruction execution apparatus has a function of executing a gesture instruction in any one of the first aspect or the optional manners of the first aspect. The gesture instruction execution apparatus includes at least one module, and the at least one module is configured to implement the gesture instruction execution method provided in any one of the first aspect or the optional manners of the first aspect. For specific details of the gesture instruction execution apparatus provided in the second aspect, refer to any one of the first aspect or the optional manners of the first aspect. Details are not described herein again.

According to a third aspect, a terminal is provided. The terminal includes a processor, and the processor is configured to execute instructions, so that the terminal performs the gesture instruction execution method provided in any one of the first aspect or the optional manners of the first aspect. For specific details of the terminal provided in the third aspect, refer to any one of the first aspect or the optional manners of the first aspect. Details are not described herein again.

Optionally, the terminal provided in the third aspect is a vehicle.

Optionally, the terminal further includes a target screen.

According to a fourth aspect, a computer-readable storage medium is provided. The storage medium stores at least one instruction, and when the instruction is read by a processor, a terminal is enabled to perform the gesture instruction execution method provided in any one of the first aspect or the optional manners of the first aspect. Optionally, the terminal is a vehicle.

According to a fifth aspect, a computer program product is provided. When the computer program product runs on a terminal, the terminal is enabled to perform the gesture instruction execution method provided in any one of the first aspect or the optional manners of the first aspect. Optionally, the terminal is a vehicle.

According to a sixth aspect, a chip is provided. When the chip runs on a terminal, the terminal is enabled to perform the gesture instruction execution method provided in any one of the first aspect or the optional manners of the first aspect. Optionally, the terminal is a vehicle.

According to a seventh aspect, a gesture control system is provided. The gesture control system includes a processor and a target screen, and the processor is configured to execute instructions, so that the gesture control system performs the gesture instruction execution method provided in any one of the first aspect or the optional manners of the first aspect.

Optionally, the gesture control system is a vehicle. The gesture control system is an in-vehicle system.

According to an eighth aspect, a gesture control apparatus is provided. The gesture control system includes a processor and program instructions, and the processor is configured to execute the program instructions, so that the gesture control system performs the gesture instruction execution method provided in any one of the first aspect or the optional manners of the first aspect.

Optionally, the gesture control apparatus may be an in-vehicle processor chip.

BRIEF DESCRIPTION OF DRAWINGS

FIG. 3 is a flowchart of a gesture instruction execution method according to an embodiment of this application;

DESCRIPTION OF EMBODIMENTS

Figure 1:
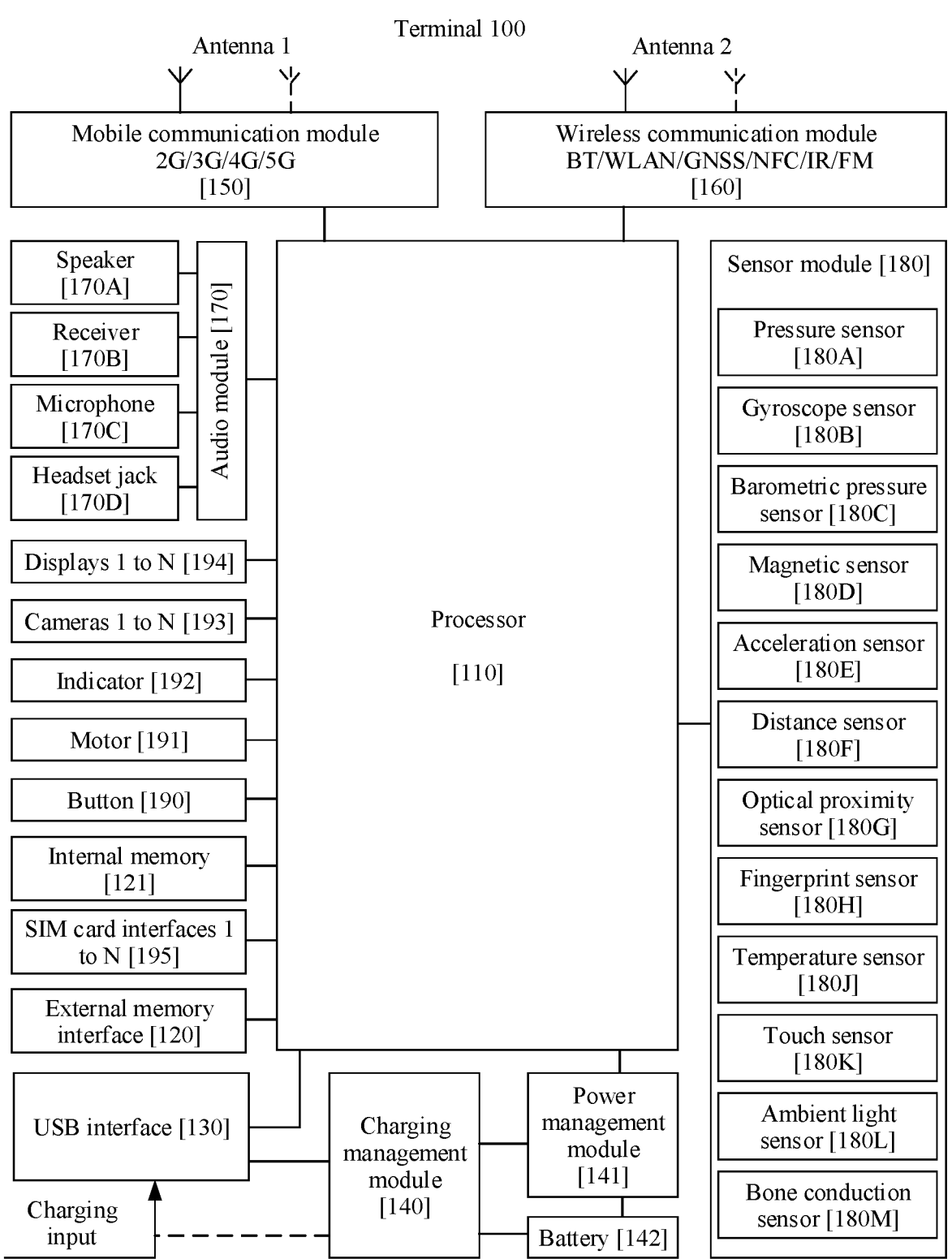
FIG. 1 is a schematic diagram of a structure of a terminal 100 according to an embodiment of this application.

To make objectives, technical solutions, and advantages of this application clearer, the following further describes implementations of this application in detail with reference to the accompanying drawings.

A free multi-window technology provided in embodiments of this application can be applied to various terminals such as a control domain cockpit, a mobile phone, a tablet computer, and a personal computer. By implementing the technology, the terminal can display windows of a plurality of applications on a target screen at the same time. Specifically, according to a multi-window display method in embodiments of this application, a free multi-window scenario of applications may be implemented on a touchscreen terminal. For example, the free multi-window display scenario of the applications may be implemented on a central control screen of the control domain cockpit, and a requirement that a plurality of users such as a driver and a front passenger drive different applications at the same time can be met. The application includes, for example, one or more of the following: a drawing application, a demonstration application, a word processing application, a website creation application, a disk burning application, a spreadsheet application, a game application, a telephone application, a video conference application, an email application, an instant message sending and receiving application, a workout support application, a photo management application, a digital camera application, a world wide web (World Wide Web, web) browsing application, a calculator application, and a shopping application, a music playing application, and/or a video playing application.

The following briefly describes application scenarios and some concepts in embodiments of this application.

The multi-window technology is a technology in which an operating system can present a plurality of applications in a plurality of windows at the same time. The multi-window technology mainly includes a split-screen mode, a picture-in-picture mode, and a free-window (free-window) mode.

A split-screen technology is to divide a target screen into a primary screen and a secondary screen, and different applications are separately run on the primary screen and the secondary screen. In the split-screen technology, usually, only a fixed application can be run on the secondary screen. In addition, because the target screen can be divided into only two areas, a maximum of two applications can be presented to a user at the same time. As a result, when the user operates a plurality of applications at the same time, the user needs to frequently perform switching operations. However, in some embodiments of this application, a plurality of applications can be presented, and a quantity of presented applications may depend on a size of the target screen.

A picture-in-picture technology is a video content presentation mode, and means that when a video is played in full screen, another video is played in a small area of a video image. An application scenario of the picture-in-picture technology is limited, and the picture-in-picture technology is usually applicable only to a video playing scenario, but not applicable to most scenarios. In addition, in the picture-in-picture technology, the target screen can be divided into only two areas. As a result, a maximum of two applications are presented at the same time. However, in some embodiments of this application, a plurality of applications can be presented to the user at the same time, and the user can operate the plurality of applications at the same time without screen switching. The user moves and scales an interface at any time as required, so that user experience is better.

A free-window technology is a technology in which a plurality of applications can be presented on the target screen, and each application can be scaled and moved at will. By using the free-window technology, the user can operate a plurality of applications without screen switching.

The central control screen of the control domain cockpit is a target screen set at a location between the driver and the front passenger of a car. Both a driver and a front passenger can use the central control screen. A control domain cockpit operating system is usually installed on the control domain cockpit, and the control domain cockpit operating system is used to control the central control screen of the control domain cockpit. However, the operating system of the current control domain cockpit is mostly transplanted from a mobile phone, and the control domain cockpit usually reuses an Android operating system. As a result, the control domain cockpit cannot perfectly fit a feature of the central control screen of the control domain cockpit. Specifically, a size of the central control screen of the control domain cockpit is large, and the large target screen is inconvenient for the user to operate the target screen. In most cases, the user needs to operate the target screen with both hands. In addition, when an application is displayed in full-screen mode, a window of one application is displayed in full-screen mode on the entire central control screen of the control domain cockpit. This undoubtedly wastes target screen resources, and a screen switching operation cannot be avoided during application switching. This causes a great risk in a control domain cockpit environment with a high security requirement. In addition, the central control screen of the control domain cockpit is usually located between the driver and the front passenger, and usually, the driver and the front passenger need to operate an application at the same time. However, the operating system of the current control domain cockpit does not support operations of a plurality of users at the same time, and the central control screen can respond to an operation of only one user at a time. As a result, a requirement that the driver and the front passenger use different applications at the same time cannot be met, and interference exists between each other. In addition, the operating system of the control domain cockpit does not provide the free-window technology, so that a requirement of randomly moving and scaling a window of an application cannot be met. Therefore, it is necessary to provide a technology for implementing a free window for the control domain cockpit operating system.

For a multi-window technology on mobile phones, mainstream operating systems of the mobile phones include an Android operating system and an iOS operating system. These operating systems implement the split-screen and picture-in-picture modes. The Android operating system provides a mechanism for supporting the free-window mode, but the Android operating system does not implement the free-window mode. In addition, in the Android operating system, only one application processes a captured focus on a target screen at a time. In other words, the target screen responds to a single-focus event. As a result, when two applications are presented, only one application can be tapped like being clicked by using a computer mouse, and the two applications cannot be operated at the same time. Therefore, only one application can respond to a touch operation event of the user at a time. In addition, because a size of the target screen of the mobile phone is small, most applications on the target screen of the mobile phone are displayed in full-screen mode, and a screen switching operation cannot be avoided during application switching.

In view of this, this application provides a free multi-window technology. The technology can be implemented by using only software without depending on specific hardware. The free multi-window technology can implement multi-driver multi-window display and interaction functions, and can be applied to the operating system of the control domain cockpit or an operating system of a terminal of another type other than the control domain cockpit. This technology is applicable to a large-screen scenario. A plurality of applications are displayed on a large screen in free multi-window mode, so that target screen resources of the large screen can be fully utilized. For example, by implementing the method on the central control screen of the control domain cockpit, the central control screen can present a plurality of applications in a plurality of windows. In this way, the central control screen can present more applications. In addition, when the user uses the central control screen of the control domain cockpit, the user can operate interfaces of the plurality of applications at the same time without screen switching. In addition, a multi-driver interaction mechanism is provided, so that a plurality of users do not interfere with each other when using different applications respectively. For example, when the driver and the front passenger operate the central control screen at the same time, the central control screen responds to operation requests of the driver and the front passenger at the same time, so that the driver and the front passenger do not interfere with each other. In addition, a window of each application can be moved randomly. In this way, when the application is far away from a seat, the user can move the window of the application to a place close to the user by using the function. This facilitates an operation of the user. In addition, the window of each application can be randomly scaled, and the window of the application can be stretched in three directions: left and right, up and down, and diagonal, so that a size of each application can be freely changed. In addition, a developer can set a startup mode of the application to the free multi-window mode, so that the application is automatically started in free multi-window mode.

The foregoing describes an application scenario of the free multi-window technology. The following describes an example of a system architecture for implementing the free multi-window technology.

FIG. 1 is a schematic diagram of a structure of a terminal 100.

The terminal 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the terminal 100. In some other embodiments of this application, the terminal 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

A memory may be further disposed in the processor 110, and is configured to store instructions and data. In some embodiments, the memory in the processor 110 is a cache memory. The memory may store an instruction or data just used or cyclically used by the processor 110. If the processor 110 needs to use the instruction or the data again, the processor 110 may directly invoke the instruction or the data from the memory. This avoids repeated access, reduces waiting time of the processor 110, and improves system efficiency. In some embodiments, the processor 110 may include one or more interfaces.

The display 194 corresponds to a target screen in embodiments of this application. The display 194 is configured to display a plurality of applications, for example, display icons of the applications or windows of the applications. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini LED, a micro LED, a micro OLED, a quantum dot light emitting diode (quantum dot light emitting diode, QLED), or the like. In some embodiments, the terminal 100 may include one or N displays 194, where N is a positive integer greater than 1.

The internal memory 121 may be configured to store computer executable program code, where the executable program code includes instructions. The internal memory 121 may include a program storage area and a data storage area. The program storage area may store an operating system, and programs of a plurality of applications (for example, a sound playing application and an image playing application). The data storage area may store data (for example, audio data and a phone book) and the like created when the terminal 100 is used. In addition, the internal memory 121 may include a high-speed random access memory, or may include a nonvolatile memory, for example, at least one magnetic disk storage device, a flash memory, or a universal flash storage (universal flash storage, UFS). The processor 110 runs the instructions stored in the internal memory 121 and/or the instructions stored in the memory disposed in the processor, to execute various function applications of the terminal 100 and process data.

The pressure sensor 180A is configured to detect a touch gesture instruction. For example, the pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal 100 determines pressure strength based on a capacitance change. When a touch operation is performed on the display 194, the terminal 100 detects intensity of the touch operation based on the pressure sensor 180A. The terminal 100 may also calculate a touch location based on a detection signal of the pressure sensor 180A. In some embodiments, touch operations performed on a same touch location but with different touch operation intensity may correspond to different touch gesture instructions. For example, when a touch operation whose touch operation intensity is less than a first pressure threshold is performed on an SMS message application icon, a touch gesture instruction for viewing an SMS message is executed. When a touch operation whose touch operation intensity is greater than or equal to the first pressure threshold is performed on the SMS message application icon, a touch gesture instruction for creating an SMS message is executed.

The touch sensor 180K is also referred to as a "touch component". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor 180K. The touch sensor may transfer the detected touch operation to the application processor, to determine a touch event type, and further determine instruction content of a touch gesture instruction based on the touch event type. Visual output related to the touch operation may be provided through the display 194. For example, a process of operating an application based on a gesture instruction is presented through the display 194. In some other embodiments, the touch sensor 180K may also be disposed on a surface of the terminal 100 at a location different from a location of the display 194.

The foregoing describes, as an example, a hardware architecture for implementing the free multi-window display technology. The following describes, as an example, a software architecture for implementing the free multi-window display technology.

Figure 2:
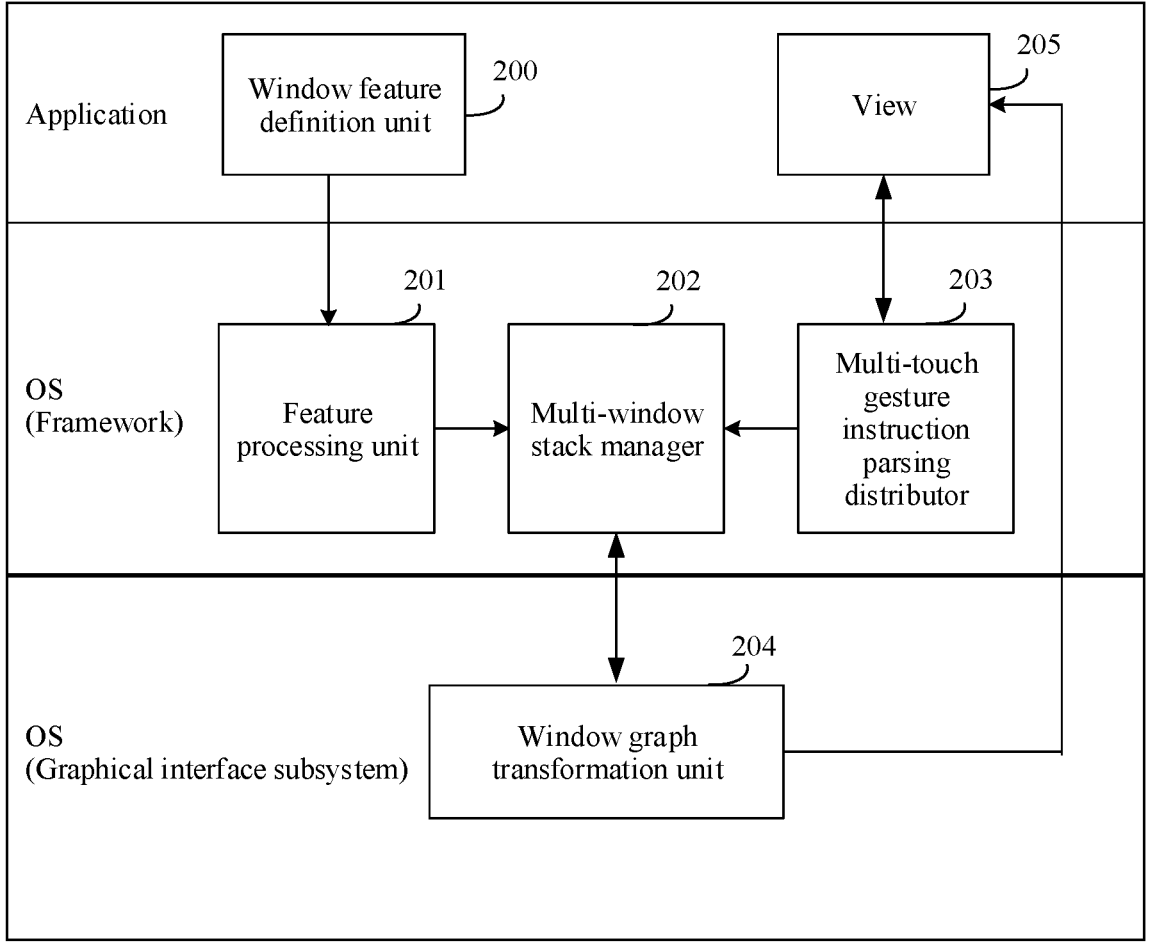
FIG. 2 is a diagram of a free multi-window system architecture according to an embodiment of this application.

Refer to FIG. 2. An embodiment of this application provides a free multi-window system architecture. The system architecture is a software architecture. The system architecture is applicable to an operating system of the terminal 100, for example, applied to a central control operating system of a control domain cockpit.

The system architecture may include at least a window feature definition unit 200, a feature processing unit 201, a multi-window stack manager 202, a multi-touch gesture instruction parsing distributor 203, and a window graph transformation unit 204. The window feature definition unit 200, the feature processing unit 201, the multi-window stack manager 202, the multi-touch gesture instruction parsing distributor 203, and the window graph transformation unit 204 are all implemented by using software.

These component units in FIG. 2 relate to three layers of an operating system, and the three layers are an application layer, a framework layer, and a graphical interface subsystem from top to bottom.

The window feature definition unit 200 is a unit added to the application layer of the operating system. The window feature definition unit 200 is used for a developer of an application to customize a free multi-window feature of the application and a startup mode of the application when developing the application. The free multi-window feature is a window range that can be customized by the application in a free multi-window mode. The startup mode of the application includes a full-screen mode, a split-screen mode, a picture-in-picture mode, and the free multi-window mode. The developer may select a proper mode based on a service requirement of the application. If the startup mode of the application is set to the free multi-window mode, after a user triggers a startup operation on the application, the application is automatically started in free multi-window mode.

The feature processing unit 201 is a unit added to the framework layer of the operating system, and is used to parse the window feature of the application when the application is started. Specifically, when the user starts the application through tapping, by using a voice, or the like, the feature processing unit 201 may parse the window feature of the application that is in the free multi-window mode and configured by the application developer, for example, obtain a size and a location of a window through parsing. The feature processing unit 201 updates values of the size and the location to window objects corresponding to the size and the location in the stack manager.

The multi-window stack manager 202 is a unit added to the framework layer of the operating system, and the multi-window stack manager 202 is used to implement multi-window display of applications. In addition, when the application is switched between different modes, the multi-window stack manager 202 is further used to perform corresponding out-stack and in-stack operations on the application, to schedule mode switching of the application. In a running process, the multi-window stack manager 202 invokes the window graph transformation unit 204 to perform interface switching and drawing.

The multi-touch gesture instruction distributor 203 is a unit added to the framework layer of the operating system, and is used to enable a plurality of users to operate different applications at the same time. Specifically, the multi-touch gesture instruction distributor 203 captures and parses a multi-touch point gesture instruction interaction event, and distributes the multi-touch point gesture instruction interaction event to a corresponding application. In the multi-window mode, when the plurality of users tap different applications on a target screen at the same time, the multi-touch gesture instruction distributor 203 calculates operation areas on the target screen of gesture instructions, compares the operation areas on the target screen of the gesture instructions with a plurality of applications currently run in the foreground, and distributes the gesture instructions to the corresponding applications for response. For example, at a moment, a driver is tapping a music application A close to a driver side, and a front passenger is swiping a shopping application B. In this scenario, the multi-touch gesture instruction distributor 203 first captures two finger touch events by using a multi-touch technology, then calculates an operation area on the target screen corresponding to coordinates of a gesture instruction of each touch event, compares the operation area on the target screen with a window of an application that is currently in the multi-window mode and that obtains a focus state, determines that an operation area on the target screen corresponding to a tap gesture instruction belongs to a screen range of the application A, and distributes the tap gesture instruction to a window view of the application A for response. Alternatively, it is determined that an operation area on the target screen corresponding to coordinates of a swipe gesture instruction belongs to a screen range of the application B, and the swipe gesture instruction is distributed to the application B for response. Particularly, when the touch event captured by the multi-touch gesture instruction distributor 203 is a movement gesture instruction, the multi-touch gesture instruction distributor 203 updates a corresponding window range in the stack manager to transfer a moved window range of a window to the window graph transformation unit 204, and invokes the window graph transformation unit 204 to draw a moved window, to perform a window movement operation. When the touch event captured by the multi-touch gesture instruction distributor 203 is a scaling gesture instruction, the multi-touch gesture instruction distributor 203 updates a corresponding window range in the stack manager to transfer a scaled window range of a window to the window graph transformation unit 204, and invokes the window graph transformation unit 204 to draw a scaled window, to perform a window scaling operation.

The window graph transformation unit 204 is a unit added to the graphic interface subsystem of the operating system, and is used to perform drawing work such as graphic changing on the window when transformation operations such as a moving operation and a scaling (including maximization) operation are performed on the window of the application in the free multi-window mode. The window graph transformation unit 204 is a support for implementing application window display, movement, scaling, and full-screen operations. In addition, when the application is switched to full-screen display, the window graph transformation unit 204 invokes the multi-window stack manager 202, so that the multi-window stack manager 202 performs corresponding scheduling.

The window graph transformation unit 204 mainly performs processing in the following four scenarios.

Scenario 1: When the user performs a movement operation, the window graph transformation unit 204 obtains a translated coordinate vector from the multi-window stack manager 202, calculates coordinate data of four vertices of a new window based on the translated coordinate vector, and redraws the window of the application to complete moving transformation.

Scenario 2: When the user performs a scaling operation, the window graph transformation unit 204 obtains a scaling origin and a scaling vector from the multi-window stack manager 202, calculates, based on the scaling origin and the scaling vector, coordinate data of four vertices and a size that are of a new window obtained after scaling, and redraws the window of the application to complete scaling transformation.

Scenario 3: When the user performs a full-screen operation, the window-graphic transformation unit 204 obtains a size of the target screen, and redraws the window of the application based on the size of the target screen to complete the full-screen operation.

Scenario 4: When the application is started in free multi-window mode, the window graph transformation unit 204 draws the window of the application based on developer-customized coordinates and size obtained from the multi-window stack manager 202, to complete starting transformation.

The foregoing describes the system architecture of the free multi-window technology. The following describes a method procedure of the free multi-window technology by using an example.

For brevity, in embodiments of this application, specific applications are subsequently represented in forms of a "target application", a "second application", and a "third application" without introducing an understanding difficulty. The "target application", the "second application", and the "third application" may be any application running on a terminal. It should be understood that terms such as "first", "second" and "third" are used to distinguish between same items or similar items that have basically same purposes or functions. It should be understood that there is no logical or time-sequential dependency between "first", "second" and "third", and a quantity and an execution sequence are not limited. It should be further understood that although the terms such as "first" and "second" are used in the following descriptions to describe various applications, these applications should not be limited by the terms. These terms are merely used to distinguish one application from another application. For example, a target application may be referred to as a second application without departing from the scope of various examples, and similarly, a second application may be referred to as a target application. Both the target application and the second application may be applications, and in some cases, may be separate and different applications.

FIG. 3 is a flowchart of a gesture instruction execution method according to an embodiment of this application. FIG. 3 is described by using an example in which the method is performed by a terminal. The method includes the following S301 to S305.

S301: The terminal displays a plurality of applications on a target screen.

Figure 4:
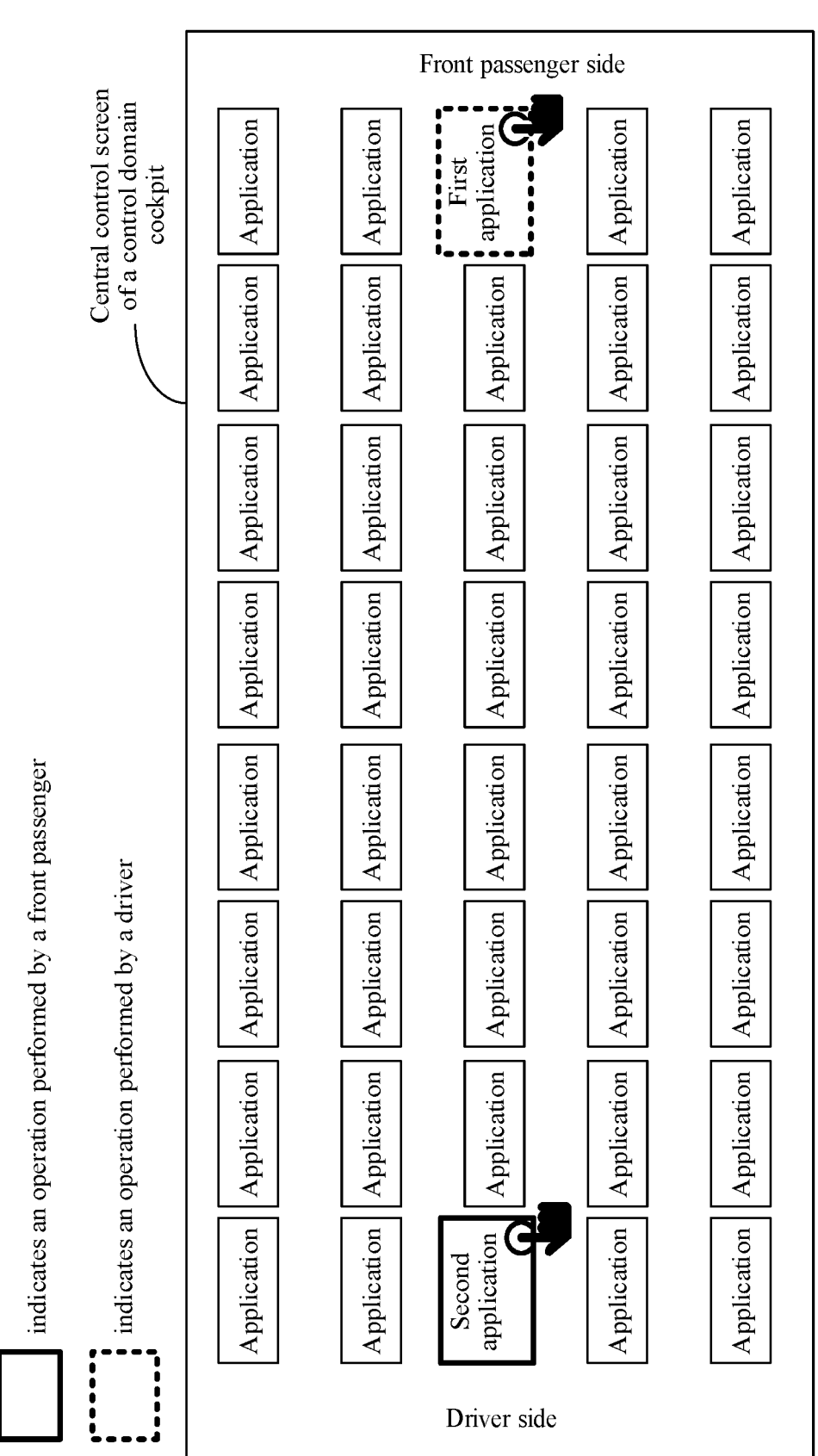
FIG. 4 is a schematic diagram of an interface displayed on a central control screen according to an embodiment of this application.

An occasion for performing S301 includes a plurality of cases. For example, after the terminal is powered on, a startup interface (also referred to as an initialization interface) is displayed on the target screen. The startup interface includes an icon of each of the plurality of applications. For example, the startup interface may be shown in FIG. 4. The scenario in which the startup interface is displayed on the target screen corresponds to a scenario in which the plurality of applications are displayed on the target screen. In this scenario, icons of the plurality of applications in the startup interface may be controlled at the same time by performing steps in this embodiment. For another example, in a process of operating the terminal, an operation interface is displayed on the target screen, and the operation interface includes windows of a plurality of applications that are being operated. For example, the operation interface may be shown in FIG. 7. The scenario in which the operation interface is displayed on the target screen also corresponds to a scenario in which the plurality of applications are displayed on the target screen. In this scenario, the windows of the plurality of applications in the operation interface may be controlled by at the same time performing steps in this embodiment.

The terminal is, for example, a control domain cockpit, a mobile phone, a tablet computer, or a personal computer. The target screen is configured on the terminal. The target screen may be a touchscreen, and may be a central control screen configured on the control domain cockpit.

The terminal displays the plurality of applications, and each application occupies a corresponding screen range on the screen. The plurality of applications are displayed in a plurality of cases. For example, when the plurality of applications are in an unopened state (for example, when the terminal is just powered on), the terminal may display the icon of each of the plurality of applications. In this case, the screen range to which each of the plurality of applications belongs includes a range covered by the icon of the application. For example, refer to FIG. 4. The plurality of applications include, for example, a first application and a second application. The central control screen may display an icon of the first application and an icon of the second application. The icon of the first application covers a specific range on a driver side of the central control screen, and the icon of the second application covers a specific range on a front passenger side of the central control screen. For another example, when the plurality of applications are in an open state, the terminal may display a window of each of the plurality of applications. In this case, the screen range to which each of the plurality of applications belongs includes a window range of the application in the open state. For example, refer to FIG. 5. The plurality of applications include, for example, a first application and a second application. The central control screen may display a window of the first application and a window of the second application. The window of the first application covers a specific range on a driver side of the central control screen, and the window of the second application covers a specific range on a front passenger side of the central control screen.

The window of the application includes an interface of the application, and the interface of the application includes information about the application and a control of the application. For example, a window of a video playing application may include a video, a play button, and a pause button, and a window of an instant messaging application includes a friend list and the like.

The terminal displays the window of each of the plurality of applications based on a multi-window technology. For example, the terminal displays the window of each of the plurality of applications in a free-window manner. When the window is displayed in the free-window manner, the window of the application may be referred to as a free window. The "free" in the free window means that at least one of a size, a shape, or a location of the window can be adjusted. The free window includes features such as a complete activity, a window, a focus, and an input of a normal activity window. A user can move, scale, open, and close the free window. For another example, the terminal displays windows of two applications in a split-screen manner. For example, the target screen is divided into a primary screen and a split screen, a window of one application is displayed on the primary screen, and a window of the other application is displayed on the secondary screen. For another example, the terminal displays windows of a plurality of applications in picture-in-picture mode, one application is displayed in full screen, and a window of another application is suspended on a window of the application displayed in full screen.

A gesture instruction may be executed by using a multi-window stack manager. The multi-window stack manager is software running on the terminal. The multi-window stack manager is used to uniformly perform stack management on window objects of applications running on the terminal, to execute the gesture instruction. The multi-window stack manager includes a plurality of types of stacks, and each type of stack is used to store a window object of an application in a corresponding mode. The multi-window stack manager can perform, by using a stack corresponding to each mode, stack management on an application started in each mode. A window range of the application and a life cycle of a window are encapsulated in the window object.

For example, the multi-window stack manager includes five types of stacks: a free multi-window stack, a full-screen stack, a split-screen primary stack, a split-screen secondary stack, and a picture-in-picture stack. The free multi-window stack is used to store a window object of an application started in free multi-window mode, the full-window stack is used to store a window object of an application started in picture-in-picture mode, the split-screen primary stack is used to store a window object of an application that is on the primary screen and that is started in split-screen mode, and the split-screen secondary stack is used to store a window object of an application that is in the secondary stack and started in split-screen mode.

The free multi-window mode is a mode in which a plurality of applications are displayed in the free-window manner. For example, if the terminal separately starts the first application, the second application, and a third application in free multi-window mode, the terminal displays the window of the first application, the window of the second application, and a window of the third application on the target screen in the free-window manner. In other words, the window of the first application, the window of the second application, and the window of the third application are all free windows. In addition, the free multi-window stack in the multi-window stack manager stores a window object of the first application, a window object of the second application, and a window object of the third application.

The following describes how to determine the window range of the application by using the stack. For example, window ranges of a plurality of applications in the open state are stored in a stack, and stack management is performed on the window range of each of the plurality of applications in the open state by using the stack. The stack may be a free multi-window stack.

The first application in the plurality of applications is used as an example. The user triggers a startup operation on the first application, the terminal receives a startup instruction for the first application, obtains a startup mode of the first application, and determines whether the startup mode of the first application is a free multi-window mode. If the startup mode of the first application is a free multi-window mode, the terminal moves the window object of the first application to the free multi-window stack, and performs stack management on the window object of the first application by using the free multi-window stack. Similarly, when a startup instruction for the second application is received, if a startup mode of the second application is a free multi-window mode, the terminal also moves the window object of the second application to the free multi-window stack, and performs stack management on the window object of the second application by using the free multi-window stack.

Optionally, a manner of obtaining the startup mode may be as follows: The terminal parses a window range of the first application, and obtains the startup mode of the first application from the window range of the first application. The startup mode of the first application may be a window range preconfigured by a developer, or may be a window range customized by the user. For example, the startup mode of the first application may be a free multi-window mode by default. In this case, each time the terminal starts the first application, the terminal automatically displays the first application in the free-window manner. Optionally, a manner of moving the window object to the free multi-window stack is: The terminal moves, according to a first in first out rule, a window object of a newly started application to the top of the free multi-window stack.

In the foregoing manner, because the terminal stores, in the free multi-window stack, the application started in free multi-window mode, the terminal can uniformly perform stack management, by using the free multi-window stack, on each application started in free multi-window mode. In addition, because the window object includes the window range of the application, when each application is displayed in the free-window manner, a window range may be obtained from a window object in the free multi-window stack to present the window of the application. This helps implement free execution of the gesture instruction.

Figure 5:
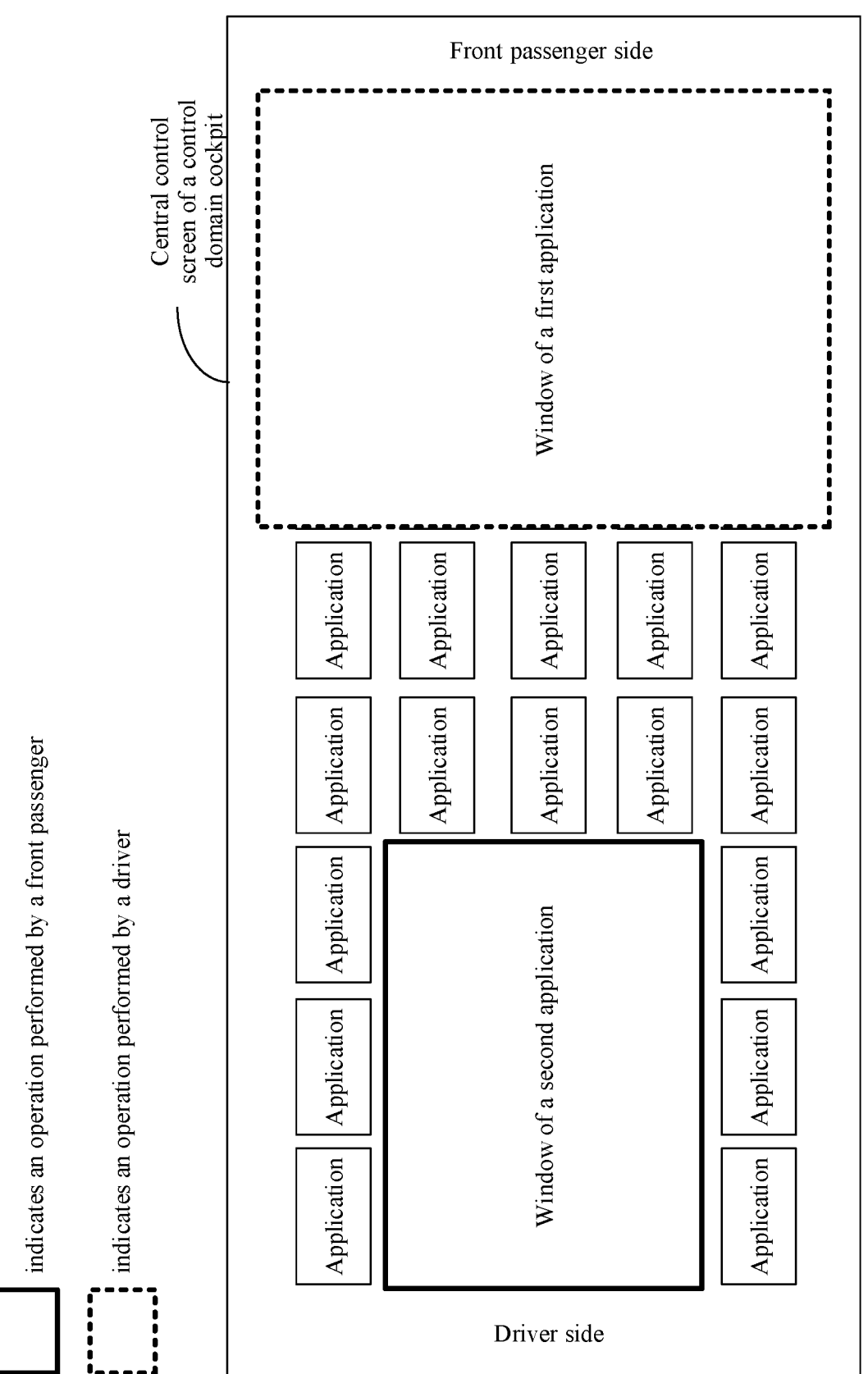
FIG. 5 is a schematic diagram of another interface displayed on a central control screen according to an embodiment of this application.

Optionally, the method provided above is applied to the control domain cockpit. After a central control system of the control domain cockpit starts a plurality of applications, the plurality of applications are displayed on the central control screen of the control domain cockpit in free multi-window mode. For example, refer to FIG. 4. The icon of the first application is located on the front passenger side of the central control screen, and the icon of the second application is located on the driver side of the central control screen. A driver taps the icon of the first application to open the first application, and the control domain cockpit starts the first application in free multi-window mode. Refer to FIG. 5. The central control screen displays the window of the first application on the front passenger side. Similarly, the front passenger taps the icon of the second application to open the second application, and the control domain cockpit starts the second application in free multi-window mode. Refer to FIG. 5. The central control screen displays the window of the second application on the driver side. It can be learned from FIG. 5 that the control domain cockpit displays the window of the first application and the window of the second application on the central control screen in free multi-window mode. Certainly, a manner of tapping the icon is an optional manner, and the driver or the front passenger may open the application by using a voice.

The following describes how to start an application in free multi-window mode. Starting the application in free multi-window mode includes Case 1 and Case 2.

Case 1: The application is started in free multi-window mode for the first time.

In Case 1, the screen range to which each of the plurality of applications belongs includes the window range of the application in the open state, and the window range of the application in the open state is a preconfigured window range.

The second application in the plurality of applications is used as an example. The user triggers a startup operation for the second application. The terminal receives a startup instruction for the second application, and opens the second application, so that the window of the second application is displayed on the target screen. If a startup mode of the second application for the first time is a free multi-window mode, the terminal displays the window of the second application on the target screen based on a window range preconfigured for the second application.

The window range can be obtained from a window attribute. The window attribute includes the window range and another parameter required for displaying the window. Some or all parameters in the window attributes can be customized by the developer of the application. A parameter that can be customized in the window attribute may be referred to as a window feature. For example, the developer of the application preconfigures the window attribute, and stores the window attribute of the application on the terminal, so that the terminal can read the window attribute of the application.

In Case 1, in a development phase, the developer of the application can customize the window range of the application in the free multi-window mode. Therefore, when the application is started, the terminal displays the window of the application based on the preconfigured window range, so that the application is automatically displayed based on the attribute customized by the developer. In this way, a requirement of the developer for customizing the window range is met.

In addition, when determining that the startup mode of the second application is a free multi-window mode, the terminal moves the window object of the second application to the free multi-window stack in the multi-window stack manager, and performs stack management on the window object of the second application by using the free multi-window stack. In addition, the terminal may perform update processing on the window object of the second application in the multi-window stack manager. For example, the terminal assigns a value to the window object of the second application in the free multi-window stack, and updates the window range in the window object to the preconfigured window range.

The window range includes at least one of a window size and a window location. Correspondingly, Case 1 includes at least one of Implementation 1 and Implementation 2.

Implementation 1: The terminal displays the window of the second application on the target screen according to a window size preconfigured for the second application, so that a window size of the window of the second application on the target screen is the preconfigured window size. In this manner, after being started, the second application is automatically displayed according to the preconfigured size. In this way, a requirement of the developer for customizing the window size is met.

The window size includes a height of the window. Correspondingly, the terminal displays the window of the second application on the target screen according to a height preconfigured for the second application, so that a height of the window of the second application on the target screen is the preconfigured height.

The window size includes a width of the window. Correspondingly, the terminal displays the window of the second application on the target screen according to a width preconfigured for the second application, so that a width of the window of the second application on the target screen is the preconfigured width.

Implementation 2: The terminal displays the window of the second application on the target screen according to a window location preconfigured for the second application, so that a window location of the window of the second application on the target screen is the preconfigured window location. In this manner, after being started, the second application is automatically displayed at the preconfigured location. In this way, a requirement of the developer for customizing the window location is met.

The window location includes vertex coordinates of the window of the application. For example, the window location includes four vertex coordinates, and the four vertex coordinates are respectively coordinates of an upper left vertex, coordinates of a lower left vertex, coordinates of an upper right vertex, and coordinates of a lower right vertex of the window of the application.

In addition, the window attribute optionally further includes a center of gravity of the window, the center of gravity is used to define a center of gravity of the window on the target screen, and the center of gravity is an optional attribute.

Figure 6:
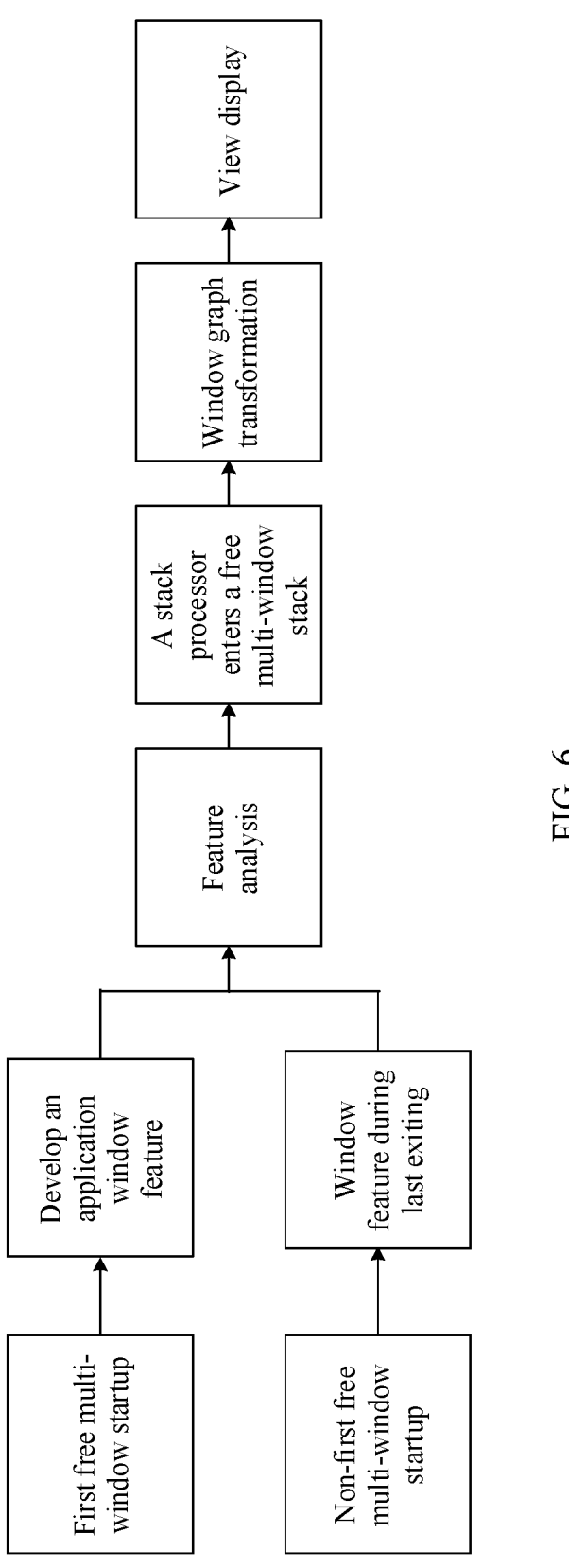
FIG. 6 is a schematic diagram of a window display procedure according to an embodiment of this application.

For a specific process of displaying the window of the second application, refer to FIG. 6. When the application is started in free multi-window mode for the first time, the terminal parses the window feature defined by the application in the development phase. For example, a feature processing unit parses a window range in a window feature definition unit of the application, performs corresponding out-stack processing and update processing in the multi-window stack manager, and then draws a window graphic feature of the application for view display after graphic changing performed by a window graph transformation unit.

Case 2: The application is started in free multi-window mode for the non-first time.

In Case 2, the screen range to which each application of the plurality of applications belongs includes a window range of the application in an open state, and the window range of the application in the open state is a window range to which each application belongs when the application exits last time.

The third application is used as an example. When the user triggers a startup operation for the third application, the terminal receives a startup instruction for the third application. If the third application is started in startup mode of the free multi-window mode for the non-first time, the terminal displays the window of the third application on the target screen based on a window range to which the third application belongs when the third application exits last time. That the third application exits means that a life cycle of the third application ends. That the third application exits last time optionally means that the third application exits after being started in free multi-window mode most recently.

When the third application is displayed in free multi-window mode, if an exit operation for the third application is detected, the terminal stores a current window range of the window of the third application. For example, the terminal updates a feature processing unit of the third application, and updates a window range stored in the feature processing unit of the third application to the current window range of the third application, so that the feature processing unit stores the window range to which the third application belongs when the third application exits last time. When the third application is started in free multi-window mode again, when reading the window range of the third application from the feature processing unit of the third application, the terminal obtains the window range to which the third application belongs when the third application exits last time, so that the terminal displays the third application according to the window range to which the third application belongs when the third application exits last time.

In addition, when determining that the startup mode of the third application is the free multi-window mode, the terminal moves the window object of the third application to the free multi-window stack, and performs stack management on the window object of the third application by using the free multi-window stack. In addition, the terminal may perform update processing on the window object of the third application in the multi-window stack manager. For example, the terminal assigns a value to the window object of the third application in the free multi-window stack, and updates a window range in the window object to the window range to which the third application belongs when the third application exits last time.

In Case 2, the terminal stores the window range to which the application belongs when the application exits last time. When the application is restarted, the window of the application is displayed according to the window range to which the application belongs when the application exits last time, so that the window of the application is displayed according to the window range to which the application belongs when the application exits last time. This ensures that the window range of the application is associated with a historical use behavior of the user, and helps ensure that the window range of the application matches a personal use habit of the user.

The window range includes at least one of a window size and a window location. Correspondingly, Case 2 includes at least one of Implementation 1 and Implementation 2.

Implementation 1: The terminal displays the window of the third application on the target screen according to a window size of the third application displayed when the application exits last time, so that a window location of the window of the third application on the target screen is the window size of the third application displayed when the application exits last time.

The window size includes a height of the window. Correspondingly, the terminal displays the window of the third application on the target screen according to a height displayed when the third application exits last time, so that a height of the window of the third application on the target screen is the height displayed when the third application exits last time.

The window size includes a width of the window. Correspondingly, the terminal displays the window of the third application on the target screen according to a width displayed when the third application exits last time, so that a width of the window of the third application on the target screen is the width displayed when the third application exits last time.

In Implementation 1, after being started, the third application is automatically displayed according to the window size of the third application displayed when the application exits last time. This ensures that the window size of the application is associated with the historical use behavior of the user, and helps ensure that the window size of the application matches the personal use habit of the user. For example, a window size that is of the third application and preset in the development phase is a quarter of a size of the target screen. In the process of displaying the window of the third application, the user triggers a scale-up gesture instruction for the window of the third application, so that the window size of the third application is scaled up from the quarter of the size of the target screen to a half of the size of the target screen. When the third application exits, the terminal updates the window size of the third application to the half of the size of the target screen. In this case, when the third application is restarted, the terminal automatically displays the window of the third application according to the half of the size of the target screen, and the user does not need to manually scale up or down the window again. This simplifies operations and facilitates use by the user.

Implementation 2: The terminal displays the window of the third application on the target screen according to a window location at which the third application exits last time. In this way, a window location of the window of the third application on the target screen is the window location at which the third application exits last time.

In Implementation 2, after being started, the third application is automatically displayed at the window location at which the third application exits last time. This ensures that the window location of the application is associated with the historical use behavior of the user, and helps ensure that the window location of the application matches the personal use habit of the user. For example, a window location that is of the third application and preset in the development phase is a left side of the target screen. However, in the process of displaying the window of the third application, because a seat of the user is on a right side of the target screen, the user triggers a movement gesture instruction for the window of the third application, so that the window location of the third application moves from the left side of the target screen to the right side of the target screen. When the third application exits, the terminal automatically updates the window location of the third application to the right side of the target screen. When the third application is restarted, the terminal automatically displays the window of the third application on the right side of the target screen. The user does not need to manually move the window to a side on which the user is located, and this simplifies the operations and facilitates use by the user.

For a specific process of displaying the window of the second application, refer to FIG. 6. When the application is started in free multi-window mode for the non-first time, the terminal parses the window range to which the application belongs when the application exits last time. For example, the feature processing unit reads and parses a window feature existing when the application exits last time in free multi-window mode, performs corresponding out-stack processing and update processing in the multi-window stack manager, and then draws a window graphic feature of the application by using the window graph transformation unit, to implement view display of the application. Refer to FIG. 5. A window size preconfigured for the first application is large, a window location preconfigured for the first application is close to the front passenger side of the central control screen, the window size preconfigured for the second application is small, and the window location preconfigured for the second application is close to the driver side of the central control screen. In this case, after the feature processing unit moves the window object of the first application and the window object of the second application to the free multi-window stack, application windows drawn by the window graph transformation unit through calculation are shown in FIG. 5. The window of the first application is close to the front passenger side, and the window of the second application is close to the driver side.

S302: The terminal obtains a plurality of gesture instructions that act on different areas of the target screen.

The gesture instruction is an action triggered on the target screen by using an object, for example, a finger, a stylus, or a pen. The terminal may recognize the gesture instruction to determine an operation represented by the gesture instruction, so as to respond to the gesture instruction based on the operation represented by the gesture instruction. From a perspective of the action corresponding to the gesture instruction, the gesture instruction includes tap, touch and hold, swipe, rotate, double-tap, scale, and the like. The gesture instruction may be executed by using one hand, or may be executed by using both hands at the same time. From a perspective of the operation represented by the gesture instruction, the gesture instruction includes a movement gesture instruction, a scaling gesture instruction, a full-screen gesture instruction, and the like. The movement gesture instruction is used to instruct to move the window of the application, the scaling gesture instruction is used to instruct to scale up or down the window of the application, and the full-screen gesture instruction is used to instruct to display the window of the application in full screen. From a perspective of whether to touch the target screen, the gesture instruction includes a touch gesture instruction and a hover gesture instruction. The touch gesture instruction is a gesture instruction executed by touching the target screen, and the hover gesture instruction is an air gesture instruction executed above the target screen. From a perspective of a quantity of touch points corresponding to the gesture instruction, the gesture instruction includes a single-point touch gesture instruction and a multi-point touch gesture instruction. The multi-point touch gesture instruction is a gesture instruction in which the target screen is touched at a plurality of points (for example, touched by a plurality of fingers) at a time point.

Different gesture instructions in the plurality of gesture instructions may act on different areas of the target screen. Optionally, the target screen is divided into at least two areas. For example, the method is applied to the control domain cockpit, the target screen is the central control screen of the control domain cockpit, and the different areas of the target screen include a driver side area on the central control screen and a front passenger side area on the central control screen. Certainly, the target screen (for example, the central control screen) may not be divided into two areas, but has more than two areas. For example, the target screen includes a plurality of touch points, and each touch point corresponds to one area. For example, refer to FIG. 4. The central control screen of the control domain cockpit includes a driver side area and a front passenger side area. After the driver taps the icon of the second application, a gesture instruction of the driver acts on the driver side area. After the front passenger taps the icon of the first application, a gesture instruction of the front passenger acts on the front passenger side area. For another example, refer to FIG. 6. After the driver taps a play button in the window of the first application, a gesture instruction of the driver acts on the driver side area, and after the front passenger swipes a friend list of the second application, a gesture instruction of the front passenger acts on the front passenger side area.

There may be a plurality of implementations of detecting the gesture instruction. For example, the terminal may detect the plurality of gesture instructions based on the target screen. The following uses Implementation 1 and Implementation 2 as examples for descriptions. Optionally, the terminal is a control domain cockpit, and the target screen is a central control screen of the control domain cockpit. A manner of detecting the gesture instruction based on the central control screen may be Implementation 1, or may be Implementation 2.

Implementation 1: How to detect a touch gesture instruction based on a touchscreen.

In Implementation 1, the target screen configured for the terminal is a touchscreen, the gesture instruction includes a touch gesture instruction, and the manner of detecting the touch gesture instruction may include: A touch event is triggered when the user places one or more fingers on the touchscreen. The terminal detects the touch event, analyzes data that is of the touch event and collected by the touchscreen, and if the data of the touch event meets a condition corresponding to the touch gesture instruction, the terminal determines that the touch gesture instruction is detected. The touch gesture instruction includes one or more touch events. The touch gesture instruction may be a separate touch event, or may be a combination of a series of continuous touch events. The data of the touch event includes coordinates of a touch point, pressure of the touch point, a touch area, whether another finger is added, and the like. When the user starts to touch the target screen, the terminal detects the touch event. In this case, the touch gesture instruction starts. Then, the terminal continuously tracks a location of a finger of the user. When all fingers of the user leave the target screen, the touch gesture instruction ends.

Implementation 2: How to detect a hover gesture instruction.

In Implementation 2, the terminal may detect, by using a sensor (for example, a front-facing camera), a distance, an angle, and a location of an input object (for example, a stylus or a finger) above a surface of the target screen, and when the input object contacts the target screen with specific intensity or pressure, to recognize the hover gesture instruction.

Optionally, S302 is applied to a scenario in which a plurality of users drive different applications at the same time, and the plurality of gesture instructions detected by the terminal are from the plurality of users. For example, each of the plurality of gesture instructions detected by the terminal is from one user.

Specifically, in a process of displaying the window of the application, a plurality of users use the terminal at the same time, and each user triggers one or more gesture instructions on the target screen of the terminal. In this case, the terminal detects a gesture instruction of each of the plurality of users based on the target screen. An example in which different users are separately referred to as a first user and a second user, and different gesture instructions are separately referred to as each gesture instruction and a second gesture instruction is used for descriptions. The plurality of gesture instructions detected by the terminal include each gesture instruction of the first user and the second gesture instruction of the second user. Optionally, the plurality of gesture instructions detected by the terminal include gesture instructions from a plurality of fingers of the user. For example, the plurality of gesture instructions detected by the terminal include each gesture instruction triggered by a left hand of the user and a second gesture instruction triggered by a right hand of the user.

Optionally, the terminal obtains the plurality of gesture instructions that act on different areas of the target screen at the same time. The concept of "at the same time" includes a plurality of cases. For example, "at the same time" refers to a same time point. To be specific, time points at which all of the plurality of gesture instructions act on the target screen are the same. For example, a gesture instruction 1 acts on an area 1 of the target screen at a time point 1, and a gesture instruction 2 acts on an area 2 of the target screen at the time point 1. Certainly, "at the same time" means that events occur successively within specific preset duration. For example, the gesture instruction 1 acts on the area 1 of the target screen at the time point 1, and the gesture instruction 2 acts on the area 2 of the target screen at a time point 2. A time difference between the time point 2 and the time point 1 is very short, and may be ignored.

For example, the method is applied to the control domain cockpit. In a driving process, when the driver triggers a gesture instruction on the central control screen, the front passenger also triggers a gesture instruction on the central control screen. In this case, the central control system of the control domain cockpit detects, at the same time, a plurality of gesture instructions acting on the central control screen. The plurality of detected gesture instructions include the gesture instruction of the driver and the gesture instruction of the front passenger. For example, the plurality of detected gesture instructions include the gesture instruction triggered on the driver side of the central control screen and the gesture instruction triggered on the front passenger side of the central control screen.

Figure 7:
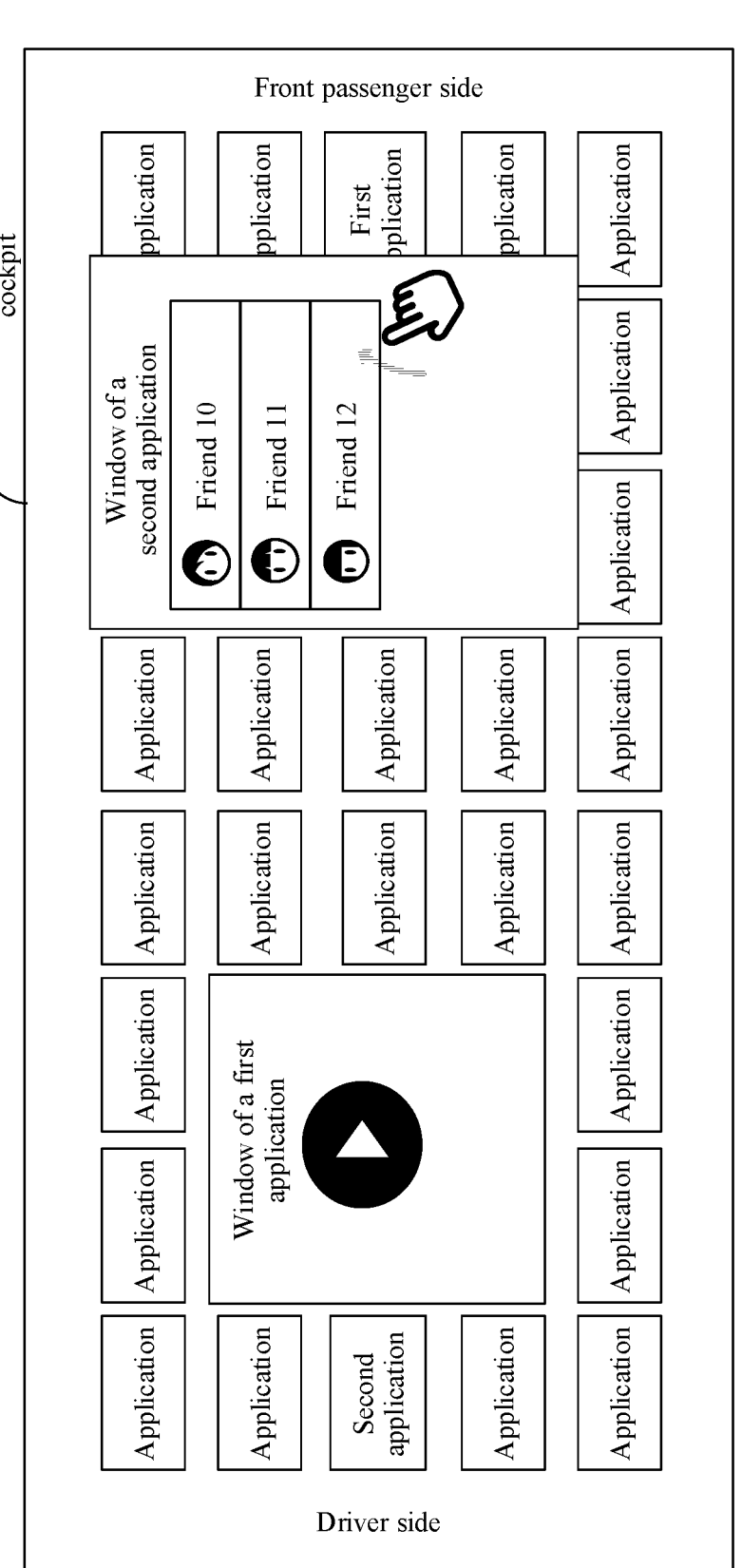
FIG. 7 is a schematic diagram of still another interface displayed on a central control screen according to an embodiment of this application.

For example, as shown in FIG. 7, a window of the target application and the window of the second application are displayed on the central control screen of the control domain cockpit, the target application is a video playing application, and the window of the target application includes a play button. The second application is an instant messaging application. The window of the second application includes the friend list. The friend list includes, for example, an information entry of a friend 10, an information entry of a friend 11, and an information entry of a friend 12. Each information entry includes a profile picture and a user nickname of a corresponding friend. The driver taps the play button in the window of the target application, and triggers a tap gesture instruction. At the same time, the front passenger swipes up the friend list in the window of the second application, and triggers a swipe gesture instruction.

S303: The terminal obtains an operation area on the target screen corresponding to each of the plurality of gesture instructions.

In response to the obtained plurality of gesture instructions, the terminal obtains the screen range to which each application displayed on the target screen belongs, obtains the operation area on the target screen of each detected gesture instruction, and compares the operation area on the target screen of each gesture instruction in the plurality of gesture instructions with the screen range to which each application in the plurality of applications belongs, to determine a window or an icon that is displayed on the target screen and on which each gesture instruction acts, so as to determine an application that should be invoked to respond to the gesture instruction. In a process of comparing the operation area on the target screen of the gesture instruction with the screen range to which the application belongs, the terminal may determine whether an operation area on the target screen of any gesture instruction belongs to a screen range to which any application belongs. If the operation area on the target screen of the gesture instruction belongs to the screen range to which the application belongs, the terminal determines that the gesture instruction acts on a window of the application in the open state or an icon of the application. If the operation area on the target screen of the gesture instruction does not belong to the screen range to which the application belongs, the terminal determines that the gesture instruction does not act on a window of the application in the open state or an icon of the application.

The operation area on the target screen of the gesture instruction is used to determine a window or an icon of an application that is displayed on the target screen and on which the gesture instruction acts. Optionally, the gesture instruction is a touch gesture instruction, an operation area on the target screen of the touch gesture instruction includes coordinates of a touch point, and the screen range to which the application belongs is a coordinate range of the window, for example, a range formed by coordinates of four vertices of the window. In this case, a comparison process may be as follows: The terminal determines whether the coordinates of the touch point corresponding to the gesture instruction belong to the coordinate range of the window, and if the coordinates of the touch point corresponding to the gesture instruction belong to the coordinate range of the window, the terminal determines that the gesture instruction acts on the window of the application.

The following provides descriptions by using an example in which the plurality of gesture instructions include each gesture instruction and the second gesture instruction, and the plurality of applications displayed on the target screen include the target application and the second application. For example, the window of the target application and the window of the second application are displayed on the target screen, and the terminal detects each gesture instruction and the second gesture instruction. The terminal obtains an operation area on the target screen of each gesture instruction, an operation area on the target screen of the second gesture instruction, a screen range to which the target application belongs, and a screen range to which the second application belongs. The terminal compares the operation area on the target screen of each gesture instruction with the screen range to which the target application belongs, and compares the operation area on the target screen of each gesture instruction with the screen range to which the second application belongs, to determine whether each gesture instruction acts on the window of the target application or the window of the second application. If the operation area on the target screen of each gesture instruction belongs to the screen range to which the target application belongs, S304 is performed. Similarly, the terminal compares the operation area on the target screen of the second gesture instruction with the screen range to which the target application belongs, and compares the operation area on the target screen of the second gesture instruction with the screen range to which the second application belongs, to determine whether the second gesture instruction acts on the window of the target application or the window of the second application. If the operation area on the target screen of the second gesture instruction belongs to the screen range to which the second application belongs, S305 is performed.

For example, when a finger of the user taps the target screen, coordinates of a touch point collected by the target screen are (x, y). The terminal determines whether (x, y) belongs to a coordinate range of the window of the target application, and if (x, y) belongs to the coordinate range of the window of the target application, the terminal determines that a tap gesture instruction acts on the window of the target application. For another example, when a finger of the user swipes on the target screen, the target screen collects coordinates of a plurality of touch points in a swiping process. The terminal may determine whether coordinates of each touch point of the plurality of touch points belong to the coordinate range of the window of the target application. If the coordinates of each touch point in the swiping process belong to the coordinate range of the window of the target application, the terminal determines a swipe gesture instruction acts on the window of the target application.

S304: The terminal determines, based on the operation area on the target screen corresponding to each of the plurality of gesture instructions and screen ranges to which the plurality of applications on the target screen belong, a target application corresponding to each gesture instruction.

S305: The terminal controls, based on instruction content of each gesture instruction, the target application corresponding to each gesture instruction.

The target application is an application corresponding to a gesture instruction in the plurality of applications. There may be one or more target applications. For example, if an operation area on the target screen of the first gesture instruction belongs to a screen range to which the first application belongs, the first application is the target application. The terminal sends operation information of the first gesture instruction to the first application, and responds to the first gesture instruction through the first application. If the operation area on the target screen of the second gesture instruction belongs to the screen range to which the second application belongs, the second application is the target application. The terminal sends operation information of the second gesture instruction to the second application, and responds to the second gesture instruction through the second application.

Optionally, the terminal determines, based on the operation area on the target screen corresponding to each of the plurality of gesture instructions and the screen ranges to which the plurality of applications on the target screen belong, target applications respectively corresponding to the plurality of gesture instructions.

Optionally, the terminal controls, at the same time based on the instruction content of each gesture instruction, the target applications respectively corresponding to the plurality of gesture instructions. In this manner, a plurality of target applications are controlled at the same time.

Figure 8:
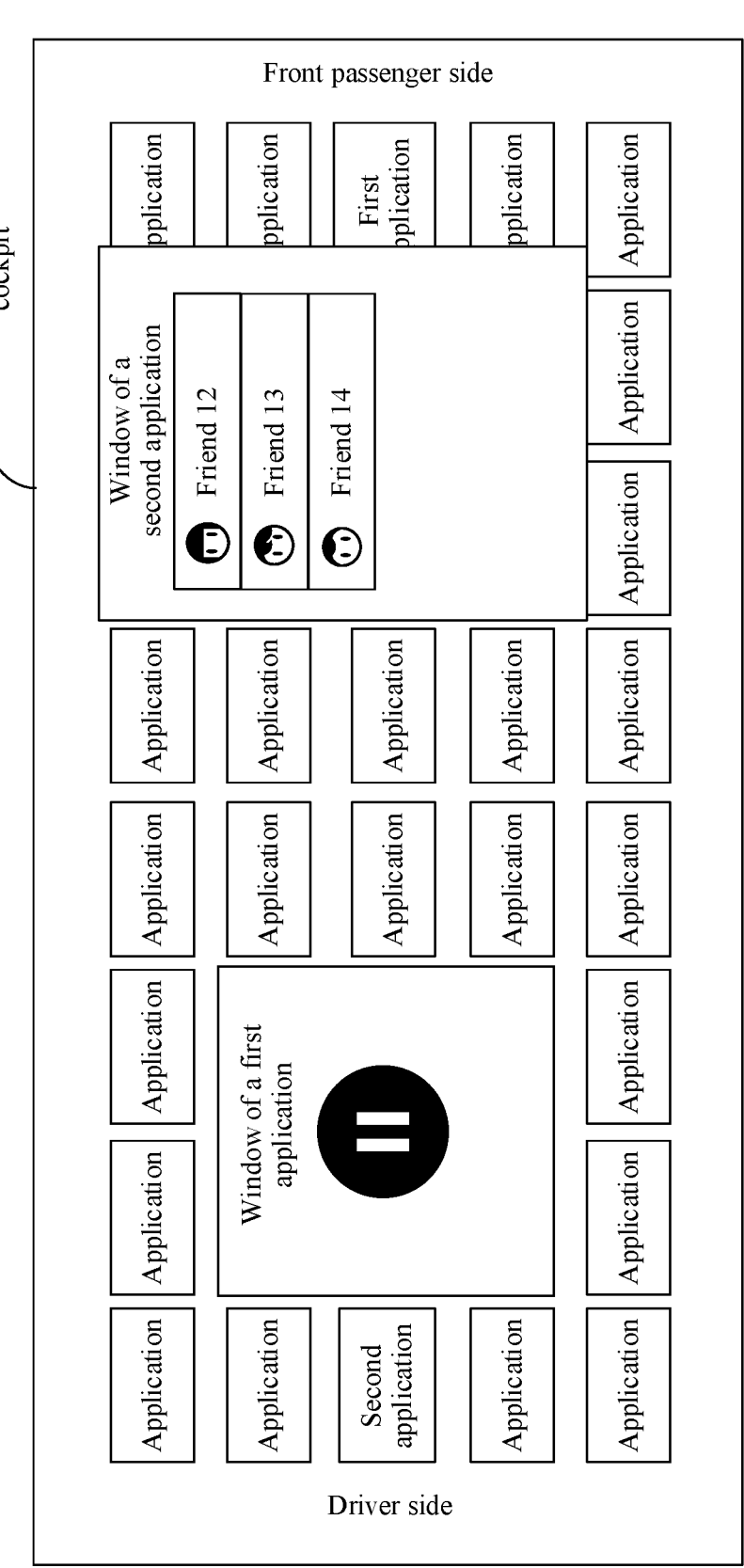
FIG. 8 is a schematic diagram of yet another interface displayed on a central control screen according to an embodiment of this application.

For example, refer to FIG. 7 and FIG. 8. Each gesture instruction is a tap gesture instruction, and the second gesture instruction is a swipe gesture instruction. After capturing the tap gesture instruction and the swipe gesture instruction, a multi-touch gesture instruction parsing distributor calculates an operation area on the target screen of the tap gesture instruction and an operation area on the target screen of the swipe gesture instruction, compares the operation area on the target screen of the tap gesture instruction and the operation area on the target screen of the swipe gesture instruction with window coordinates of the foreground target application and the second application in multi-window mode. After comparison, if it is determined that the operation area on the target screen of the tap gesture instruction is in the window of the target application, and it is determined that the operation area on the target screen of the swipe gesture instruction is in the window of the second application, the multi-touch gesture instruction parsing distributor distributes the tap gesture instruction to the target application, and distributes the swipe gesture instruction to the second application. A touch event listener of the target application responds to the tap gesture instruction, and a touch event listener of the second application responds to the swipe gesture instruction. A response result is shown in FIG. 8. The target application responds to the tap gesture instruction on a play option, and plays a video. The second application responds to the swipe gesture instruction on the friend list, and swipes the friend list, for example, swipes from the information entry of the friend 10, the information entry of the friend 11, and the information entry of the friend 12 to the information entry of the friend 12, an information entry of the friend 13, and an information entry of the friend 14.

Figure 9:
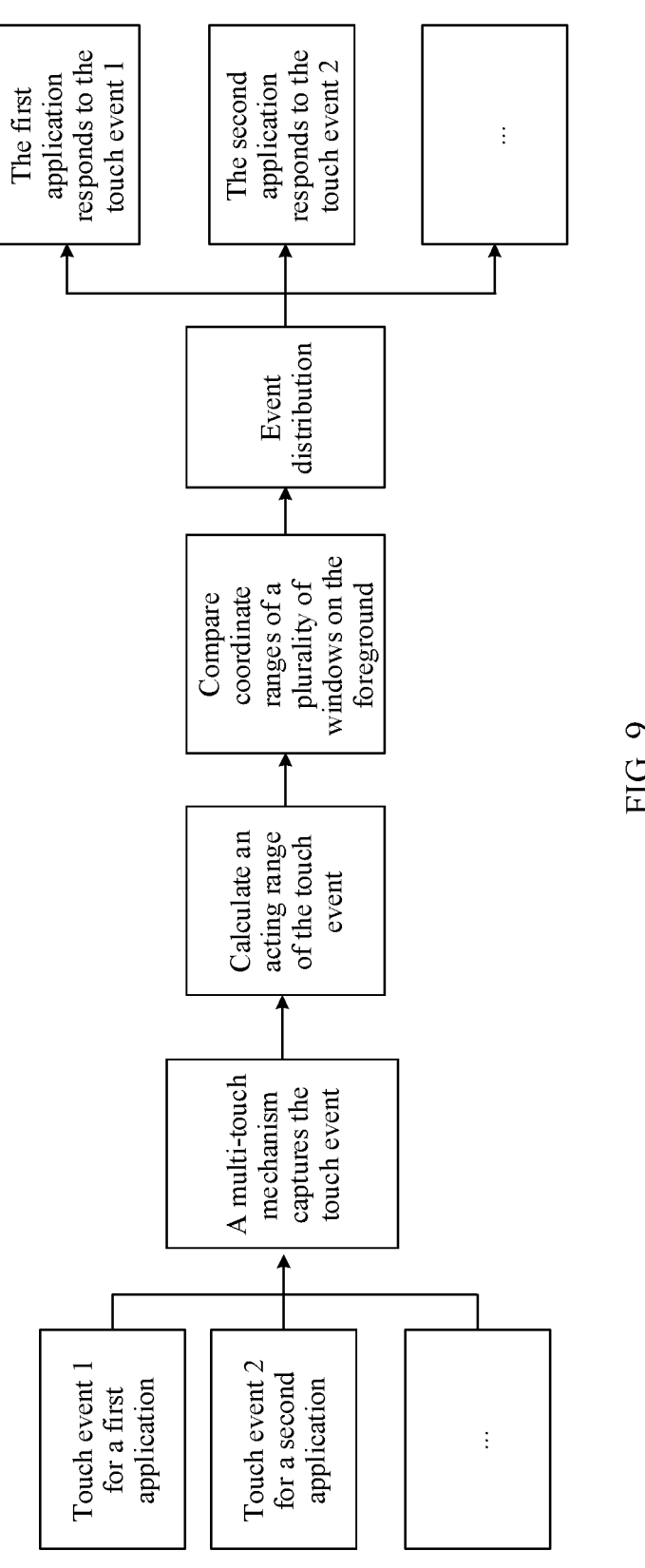
FIG. 9 is a schematic diagram of a gesture instruction response procedure according to an embodiment of this application.

The gesture instruction may be a touch gesture instruction, the gesture instruction includes a touch event, the operation area on the target screen of the gesture instruction includes an operation area on the target screen of the touch event, and responding to the gesture instruction includes responding to the touch event. For example, FIG. 9 is a flowchart of operating different applications at the same time by a plurality of users. A first user triggers a touch event 1 for the target application, and a second user triggers a touch event 2 for the second application. A multi-touch mechanism captures the touch event 1 and the touch event 2, and calculates an operation area on the target screen of the touch event 1 and an operation area on the target screen of the touch event 2. The operation area on the target screen of the touch event 1 and the operation area on the target screen of the touch event 2 are separately compared with coordinate ranges of a plurality of windows currently displayed in the foreground, to determine that the operation area on the target screen of the touch event 1 belongs to a screen range to which the target application belongs and the operation area on the target screen of the touch event 2 belongs to a screen range to which the second application belongs, so as to distribute the touch event 1 to the target application and distribute the touch event 2 to the second application. The target application responds to the touch event 1, and the second application responds to the touch event 2.

Embodiments provide a method for supporting the plurality of users in driving different applications at the same time. A plurality of applications are displayed on the target screen in a plurality of windows. In a process in which the plurality of users use a same terminal, each user can separately trigger gesture instructions for different applications. In this case, the terminal detects a plurality of gesture instructions based on the target screen, and distributes operation information of the gesture instruction of each user to a corresponding application, and each application responds to the gesture instruction of the corresponding user. In this way, the same target screen can respond to interaction events of the plurality of users at the same time, and each user can operate a preferred application without interfering with each other. This implements a function that the plurality of users drive different applications at the same time.

Especially, by applying the method on the control domain cockpit, the central control screen of the control domain cockpit displays the plurality of applications in a plurality of windows, and the driver and the front passenger can operate preferred applications at the same time. The control domain cockpit distributes, based on the central control screen, operation information of a gesture instruction on the driver side and operation information of a gesture instruction on the front passenger side to corresponding applications on the control domain cockpit, and separately responds to the gesture instruction of the driver and the gesture instruction of the front passenger through different applications. Therefore, the central control screen can respond to operation requests of the driver and the front passenger at the same time, and an operation of the driver and an operation of the front passenger do not interfere with each other, so that a requirement that the driver and the front passenger use different applications at the same time is met, and a scenario in which the plurality of users such as the driver and the front passenger operate the central control screen of the control domain cockpit is supported.

The following describes how to implement random movement of the window of the application based on the foregoing embodiments.

The each gesture instruction may be a movement gesture instruction. The movement gesture instruction is used to instruct to move the window of the application, and XOX may include: The terminal moves the window of the target application on the target screen based on operation information of the movement gesture instruction. The operation information of the movement gesture instruction includes a translation coordinate vector. The terminal may calculate four vertex coordinates of a moved window based on the translation coordinate vector, redraw the window of the target application based on the four vertex coordinates, and display a drawn window of the target application. In this case, because vertex coordinates of the redrawn window of the target application are different from the vertex coordinates of the window of the target application before movement, a display location of the window of the target application on the target screen changes, so that a moving transformation effect of the window of the application is implemented. In this implementation, the window of the application can be randomly moved on the target screen. The user can move the window of the application to a location at which the user can easily operate the application, and this facilitates use of the application by the user.

After calculating the vertex coordinates of the moved window, the terminal updates a window range of the application based on the vertex coordinates, for example, changes the vertex coordinates in the window range from the vertex coordinates of the window before movement to the vertex coordinates of the moved window. In addition, the terminal may perform update processing on a window object of the target application in a multi-window stack manager. For example, the terminal updates a window range of the window object of the target application in a free multi-window stack, and updates vertex coordinates in the window object from the coordinates before movement to the coordinates after movement.

For example, refer to the system architecture shown in FIG. 2. When the user performs a move operation on the window of the application, the multi-touch instruction distributor updates a corresponding window range in the multi-window stack manager, and invokes a window graph transformation unit. The window graph transformation unit obtains a translated coordinate vector from the multi-window stack manager, calculates coordinate data of four vertices of a new window based on the translated coordinate vector, and redraws the window of the application to complete moving transformation. For example, refer to FIG. 10. After the system captures a movement gesture instruction and obtains the movement gesture instruction through parsing, the window graph transformation unit calculates a size of a moved window and a location of the moved window, redraws a window according to the size of the moved window and the location of the moved window, and finally performs transformation through view display to display the moved window.

Figure 11:
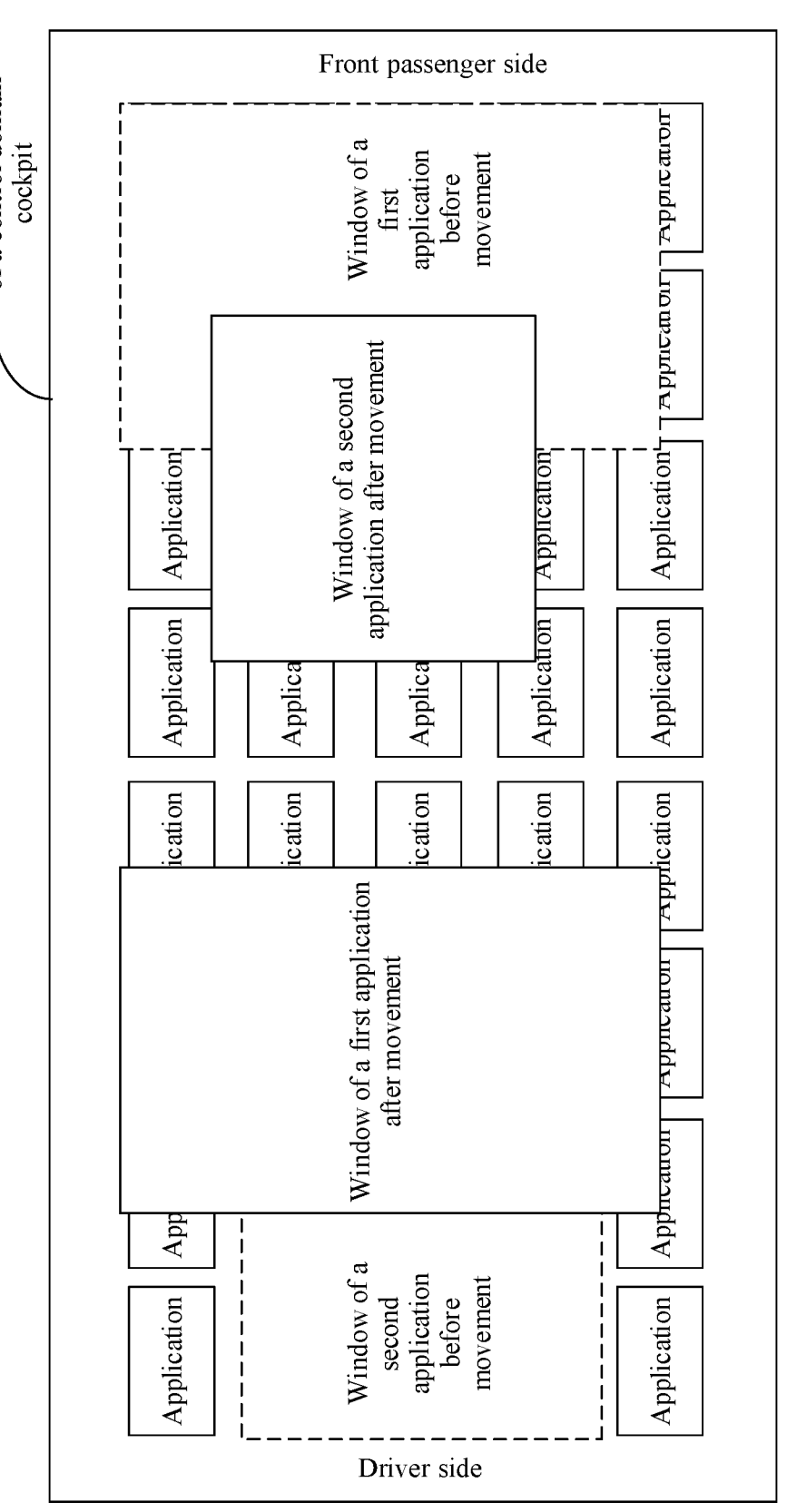
FIG. 11 is a schematic diagram of still yet another interface displayed on a central control screen according to an embodiment of this application.

For example, the method is applied to the control domain cockpit. Refer to FIG. 11. The driver opens the window of the target application, and the front passenger opens the window of the second application. Before the target application and the second application are moved, the window of the target application is close to the front passenger side of the central control screen. Because the target application is far away from the seat of the driver, it is inconvenient for the driver to operate the target application. However, the window of the second application is close to the driver side of the central control screen. Because the second application is far away from the seat of the front passenger, it is inconvenient for the front passenger to operate the second application. In addition, in processes in which the driver operates the target application and the front passenger operates the second application, operations of the driver and the front passenger interfere with each other. According to the method provided in this embodiment, the driver triggers a movement gesture instruction by dragging a toolbar on an upper side of the window of the target application. In this case, the control domain cockpit moves the window of the target application from the front driver side of the central control screen to the driver side of the central control screen, so that a location of the window of the target application is close to the driver who needs to operate the target application. This facilitates the driver to operate the target application. Similarly, the front passenger triggers a movement gesture instruction by dragging a toolbar on an upper side of the window of the second application. In this case, the control domain cockpit moves the window of the second application from the driver side of the central control screen to the front passenger side of the central control screen, so that a location of the window of the second application is close to the front passenger who needs to operate the second application. This facilitates the front passenger to operate the second application. In this way, requirements of the driver and the front passenger for moving the application to their own side are met. In addition, because both the driver and the front passenger can operate the applications on their own side, a case in which operations of the driver and the front passenger interfere with each other is avoided.

The following describes how to implement random scaling of the window of the application based on the foregoing embodiments.

Each of the foregoing gesture instructions may be a scale gesture instruction. The scale gesture instruction is used to instruct to scale up or down the window of the application. The terminal scales up or down the window of the target application on the target screen based on operation information of the scale gesture instruction. The operation information of the scale gesture instruction includes a scale origin and a scale vector. The terminal may calculate, based on the scale origin and the scale vector, a size and coordinates of each of four vertices of a scaled window, redraw a window of the target application according to the size and the coordinates of the vertices of the scaled window, and display the drawn window of the target application. In this case, because a size of the redrawn window of the target application is different from a size of the window of the target application before movement, a size of the window of the target application displayed on the target screen changes, so that a moving transformation effect is implemented. In this manner, a window of each application can be randomly scaled, and the user can scale an application to a proper size. This meets a requirement of the user for adjusting a window size.

In addition, the terminal may perform update processing on a window object of the target application in a multi-window stack manager. For example, the terminal updates a window range of the window object of the target application in a free multi-window stack, updates vertex coordinates in the window object from coordinates before scaling to coordinates after scaling, and updates a window size in the window object from a size before scaling to a size after scaling.

Optionally, scaling is implemented based on stretch operations in different directions. Specifically, the scale gesture instruction includes a stretch gesture instruction triggered on a window border, and a process of scaling up or down the window includes: scaling up the window of the target application based on operation information of a stretch gesture instruction in a first direction; or scaling down the window of the target application based on operation information of a stretch gesture instruction in a second direction. The second direction is a reverse direction of the first direction.

Optionally, the process of scaling up or down the window is implemented through stretching in a horizontal direction. The horizontal direction is also referred to as a lateral direction or a left-right direction. In this case, the first direction described above is left, and the second direction described above is right, or the first direction described above is right, and the second direction described above is left.

Specifically, when the user taps a left border of the window of the target application to stretch leftward, the terminal scales up the window of the target application based on information about the leftward stretching operation performed on the left border of the window, so that the window of the target application is scaled up as the user stretches. Similarly, when the user taps a right border of the window to stretch rightward, the terminal scales up the window of the target application based on information about the rightward stretching operation performed on the right border of the window, so that the window of the target application is scaled up as the user stretches. On the contrary, when the user taps the left border of the window to stretch rightward, the terminal scales down the window of the target application based on information about the rightward stretching operation performed on the left border of the window, so that the window of the target application is scaled down as the user stretches. When the user taps the right border of the window to stretch leftward, the terminal scales down the window of the target application based on information about the leftward stretching operation performed on the right border of the window, so that the window of the target application is scaled down as the user stretches.

Optionally, the process of scaling up or down the window is implemented through stretching in a vertical direction. The vertical direction is also referred to as a longitudinal direction or an up/down direction. In this case, the first direction described above is upward, and the second direction described above is downward, or the first direction described above is downward, and the second direction described above is upward.

Specifically, when the user taps a lower border of the window of the target application to stretch downward, the terminal scales up the window of the target application based on information about the downward stretching operation performed on the lower border of the window, so that the window of the target application is scaled up as the user stretches. Similarly, when the user taps an upper border of the window to stretch upward, the terminal scales up the window of the target application based on information about the upward stretching operation performed on the upper border of the window, so that the window of the target application is scaled up as the user stretches. On the contrary, when the user taps the lower border of the window to stretch upward, the terminal scales down the window of the target application based on information about the upward stretching operation performed on the lower border of the window, so that the window of the target application is scaled down as the user stretches. When the user taps the upper border of the window to stretch downward, the terminal scales down the window of the target application based on information about the downward stretching operation performed on the upper border of the window, so that the window of the target application is scaled down as the user stretches.

Optionally, the process of scaling up or down the window is implemented through stretching in a diagonal direction. In this case, the first direction described above is a lower left direction, and the second direction described above is an upper right direction, or the first direction described above is an upper left direction, and the second direction described above is a lower right direction. Alternatively, the first direction described above is a lower right direction, and the second direction described above is an upper left direction. Alternatively, the first direction described above is a upper right direction, and the second direction described above is an lower left direction.

Specifically, when the user taps a lower left corner border of the window of the target application to stretch lower leftward, the terminal scales up the window of the target application based on information about the lower leftward stretching operation performed on the lower left corner border of the window, so that the window of the target application is scaled up as the user stretches. Similarly, when the user taps an upper right corner border of the window to stretch upper rightward, the terminal scales up the window of the target application based on information about the upper rightward stretching operation performed on the upper right corner border of the window, so that the window of the target application is scaled up as the user stretches. On the contrary, when the user taps the lower left corner border of the window to stretch upper rightward, the terminal scales down the window of the target application based on information about the upper rightward stretching operation performed on the lower left corner border of the window, so that the window of the target application is scaled down as the user stretches. When the user taps the upper right corner border of the window to stretch lower leftward, the terminal scales down the window of the target application based on information about the lower leftward stretching operation performed on the upper right corner border of the window, so that the window of the target application is scaled down as the user stretches.

Figure 12:
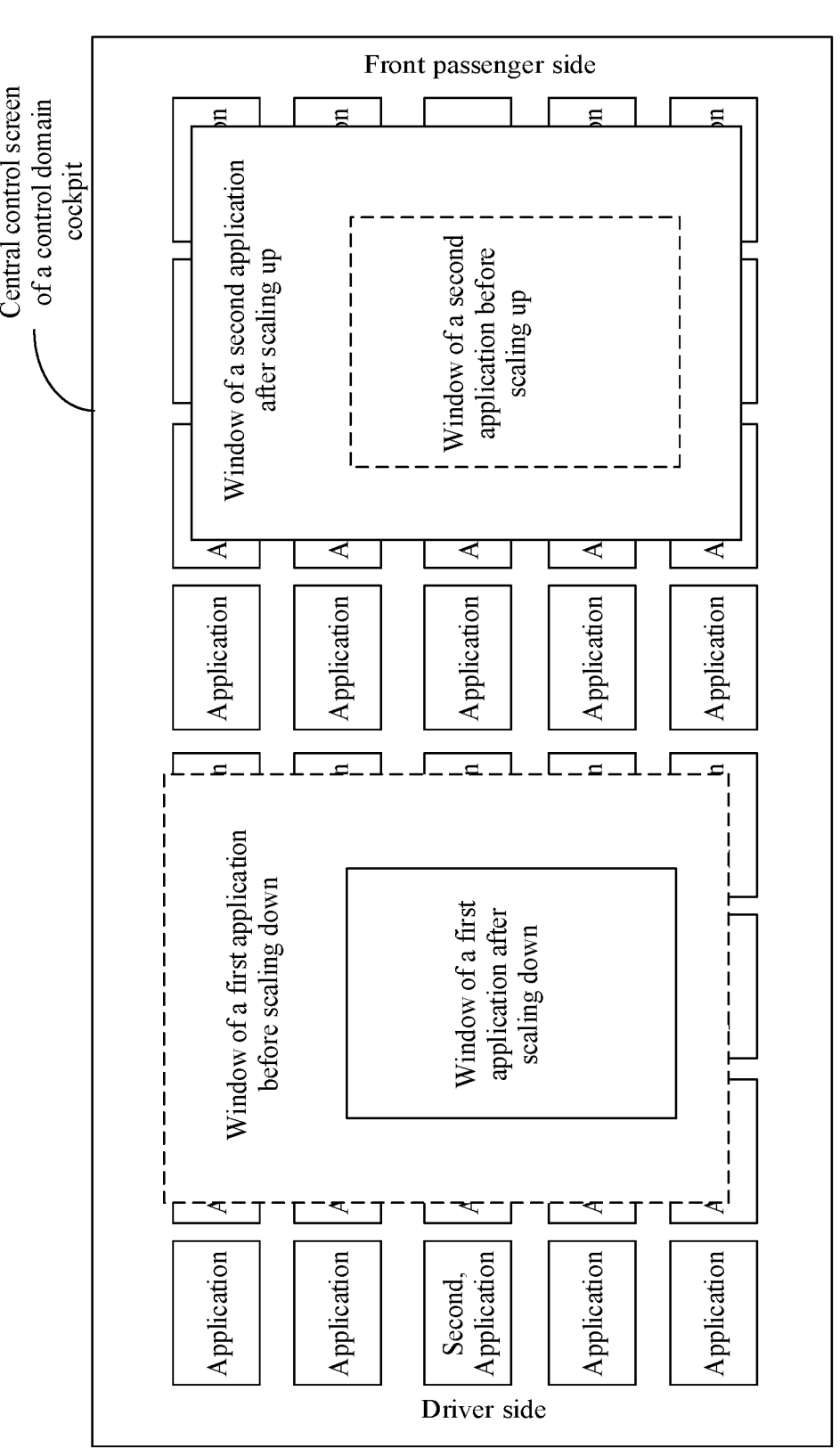
FIG. 12 is a schematic diagram of a further interface displayed on a central control screen according to an embodiment of this application.

For example, FIG. 12 is a schematic diagram of scaling the window of the application. In this embodiment, there are three scaling manners. The first manner is horizontal scaling. In the horizontal scaling manner, a finger taps a left border of the window to stretch leftward to scale up or taps a right border of the window to stretch rightward to scale up, and an operation performed in a reverse direction is scaling down. The second manner is vertical scaling. In the vertical scaling manner, a finger taps a lower border of a window to stretch downward to scale up, and an operation performed in a reverse direction is scaling down. The third manner is diagonal scaling. In the diagonal scaling manner, a lower left corner border is tapped to stretch lower leftward to scale up or a lower right corner border is tapped to stretch lower rightward to scale up, and an operation performed in a reverse direction is scaling down. In this example, the driver considers that the window of the target application is large, and the window of the target application is scaled down in any one of the foregoing three manners. However, the front passenger considers that the window of the second application is small, and the window of the second application is scaled up in any one of the foregoing three manners. Window scaling effects of the target application and the second application are shown in FIG. 12.

In the foregoing implementations, the window of the application can be stretched in a left-right direction, an up-down direction, and a diagonal direction, so that the window size of the application can be freely changed.

Figure 10:
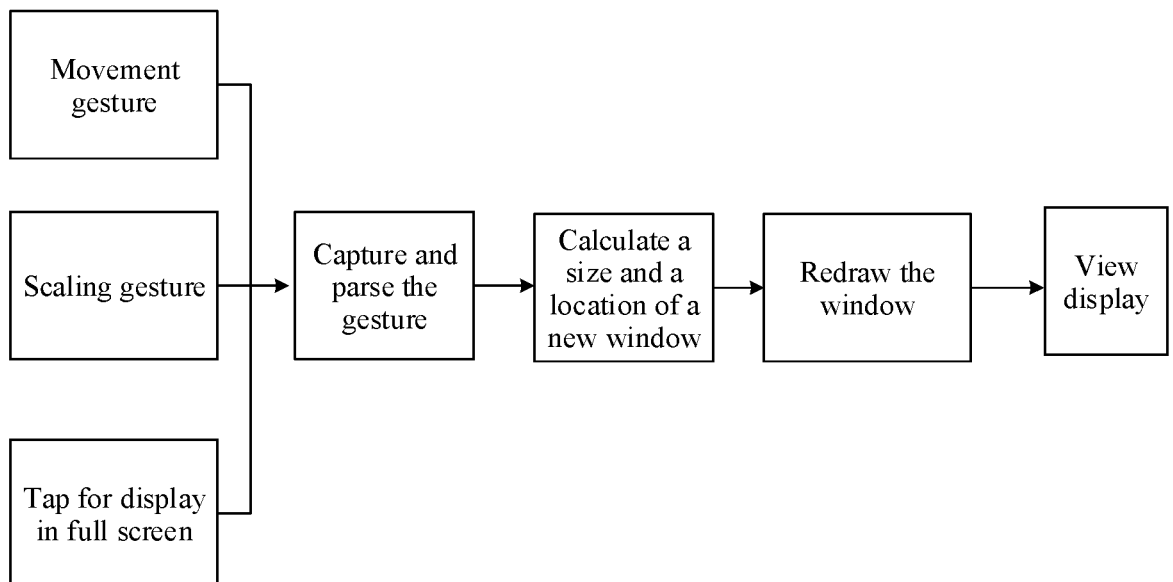
FIG. 10 is a schematic diagram of another gesture instruction response procedure according to an embodiment of this application.

For example, refer to FIG. 10. After the system captures a movement gesture instruction and obtains the movement gesture instruction through parsing, the window graph transformation unit calculates a window size after scaling and a window location after scaling, redraws a window according to the window size after scaling and the window location after scaling, and finally performs transformation through view display to display a scaled window.

In addition, when a preconfigured window size includes a smallest height and a smallest width, when scaling down the window of the target application, the terminal may determine whether a height of the window of the target application reaches the smallest height. If the height of the window of the target application has reached the smallest height, the terminal stops continuing to scale down the height of the target application. This ensures that the height of the window of the target application is greater than or equal to the smallest height. Similarly, when scaling down the window of the target application, the terminal may determine whether a width of the window of the target application reaches the smallest width. If the width of the window of the target application has reached the smallest width, the terminal stops continuing to scale down the width of the target application. This ensures that the width of the window of the target application is greater than or equal to the smallest width. The smallest height is a smallest value of a height to which the window can be scaled down when graphic transformation is performed on the window. The smallest width is a smallest value of a width to which the window can be scaled down when the system performs graphic transformation on the window. By using the smallest height and the smallest width, a smallest size to which the window of the application can be scaled down can be preset when the window of the application is scaled up or down.

The following describes how to switch a display manner of an application from a free-window mode to a full-screen mode based on the foregoing embodiments.

The each gesture instruction may be a full-screen gesture instruction, the full-screen gesture instruction is used to instruct to move a window of the application, and an action corresponding to the full-screen gesture instruction may be tapping a maximize button in the window of the application. After detecting the full-screen gesture instruction, the terminal displays the window of the target application in full screen on the target screen based on operation information of the full-screen gesture instruction. For example, the terminal redraws the window of the application based on the size of the target screen, for example, determines a width of the window based on a width of the target screen, determines a height of the window based on a height of the target screen, draws the window of the application according to the determined width and height, and displays a drawn window of the application, to display the window of the application in full screen. The width of the window of the application displayed in full screen is less than or equal to the width of the target screen, and the height of the window of the application displayed in full screen is less than or equal to the height of the target screen. For example, if the terminal displays a status bar on the top of the target screen, and displays the window of the application below the status bar, the height of the window of the application is a difference between the height of the target screen and a height of the status bar, and the width of the window of the application is equal to the width of the target screen.

If the application is started in free multi-window mode for the first time, a window range of the application is an attribute preset by the developer. In the foregoing manner, the width of the window of the application is updated from a preconfigured width to the width corresponding to the target screen, and the height of the window of the application is updated from a preconfigured height to the height corresponding to the target screen. If the application is started in free multi-window mode for the non-first time, a window range of the application is a window range to which the application belongs when the application exits last time. In the foregoing manner, the width of the window of the application is updated from a width displayed when the application exits last time to the width corresponding to the target screen, and the height of the window of the application is updated from a height displayed when the application exits last time to the height corresponding to the target screen.

In addition, when detecting the full-screen gesture instruction, the terminal may move the window object of the target application out of the free multi-window stack in the multi-window stack manager, and move the window object of the target application to a full-screen stack in the multi-window stack manager. In this case, the full-screen stack stores the window object of the target application. The terminal may perform stack management on the window object of the target application by using the full-screen stack. In this manner, when the application switches between the free multi-window mode and the full-screen mode, a window object of the application can be stored by using a stack of the corresponding mode.

The foregoing uses a scenario of switching from the free multi-window mode to the full-screen mode as an example for descriptions. The application may have another mode switching scenario, for example, switching from the full-screen mode to the free multi-window mode, or switching from the free multi-window mode to the split-screen mode. Implementation details in the another mode switching scenario are similar to implementation details in the scenario of switching from the free multi-window mode to the full-screen mode, and details are not described herein.

For example, refer to FIG. 10. After the system captures the full-screen gesture instruction and obtains the full-screen gesture instruction through parsing, the window graph transformation unit calculates a window size of full-screen display and a window location of full-screen display, redraws the window based on the window size of full-screen display and the window location of full-screen display, and finally performs transformation through view display to display the window in full screen.

The foregoing describes the gesture instruction execution method in embodiments of this application. The following describes a gesture instruction execution apparatus in embodiments of this application. It should be understood that the apparatus applied to executing a gesture instruction has any function of the terminal in the foregoing methods.

Figure 13:
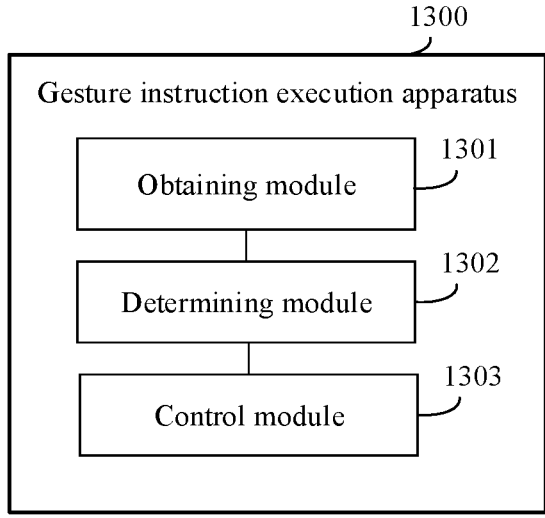
FIG. 13 is a schematic diagram of a structure of a gesture instruction execution apparatus according to an embodiment of this application.

FIG. 13 is a schematic diagram of a structure of a gesture instruction execution apparatus according to an embodiment of this application. As shown in FIG. 13, a gesture instruction execution apparatus 1300 includes: an obtaining module 1301, configured to perform S302 and S303; a determining module 1302, configured to perform S304; and a control module 1303, configured to perform S305.

It should be understood that the apparatus 1300 corresponds to the terminal in the foregoing method embodiments, and the modules in the gesture instruction execution apparatus and the foregoing other operations and/or functions are separately used to implement various steps and methods implemented by the terminal in the method embodiments. For specific details, refer to the foregoing method embodiments. For brevity, details are not described herein again.

It should be understood that, when the apparatus 1300 executes a gesture instruction, division into the foregoing functional modules is merely used as an example for descriptions. During actual application, the foregoing functions may be allocated to different functional modules for implementation based on a requirement. In other words, an internal structure of the apparatus 1300 is divided into different functional modules, to complete all or part of the functions described above. In addition, the apparatus 1300 provided in the foregoing embodiments and the method embodiments for executing the gesture instruction pertain to a same concept. For a specific implementation process of the apparatus 1300, refer to the method embodiments. Details are not described herein again.

Figure 14:
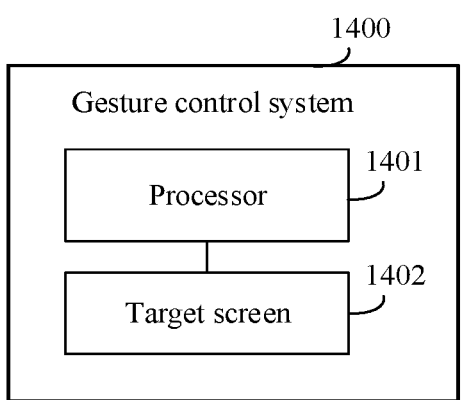
FIG. 14 is a schematic diagram of a structure of a gesture control system according to an embodiment of this application.

FIG. 14 is a schematic diagram of a structure of a gesture control system according to an embodiment of this application. The gesture control system 1400 includes a processor 1401 and a target screen 1402. The processor 1401 is configured to execute instructions, so that the gesture control system 1400 performs the foregoing gesture instruction execution method.

Optionally, the gesture control system 1400 is a vehicle.

Optionally, the gesture control system 1400 is an independent in-vehicle system configured to implement a gesture control function.

For example, the processor 1401 may be a network processor 1401 (Network Processor, NP for short), a central processing unit 1401 (central processing unit, CPU), an application-specific integrated circuit (application-specific integrated circuit, ASIC), or an integrated circuit configured to control program execution in the solutions of this application. The processor 1401 may be a single-core processor (single-CPU) 1401, or may be a multi-core processor (multi-CPU) 1401. There may be one or more processors 1401.

The target screen 1402 is configured to display a window of an application, and the window of the application includes a UI (User Interface, user interface). The UI may include a graph, a text, an icon, a video, and any combination thereof. When the target screen 1402 is a touch display, the target screen 1402 further has a capability of collecting a touch signal on or above a surface of the target screen 1402. The touch signal may be entered as a control signal into the processor 1401 for processing. In this case, the target screen 1402 may be further configured to provide a virtual button and/or a virtual keyboard. The virtual button and/or the virtual keyboard is also referred to as a soft button and/or a soft keyboard. In some embodiments, there may be one target screen 1402, and a front panel of the gesture control system 1400 is disposed. In some other embodiments, there may be at least two target screens 1402, and the target screens 1402 are separately disposed on different surfaces of the gesture control system 1400 or are folded. In still some embodiments, the target screen 1402 may be a flexible display, and is disposed on a curved surface or a folded surface of the gesture control system 1400. Even, the target screen 1402 may alternatively be set to an irregular shape that is not a rectangle, that is, an abnormal-shape screen. The target screen 1402 may be prepared by using materials such as an LCD (Liquid Crystal Display, liquid crystal display), and an OLED (Organic Light-Emitting Diode, organic light-emitting diode).

A person of ordinary skill in the art may be aware that, in combination with the examples described in embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments in this application.

In addition, function units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for indicating a computer device (which may be a personal computer, a server, a network device, or the like) to perform all or some of the steps of the method described in embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

All or some of the foregoing embodiments may be implemented by using software, hardware, firmware, or any combination thereof. When embodiments are implemented by using the software, all or some of the embodiments may be implemented in a form of a computer program product. The computer program product includes one or more computer program instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer program instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid-state drive).

A person of ordinary skill in the art may understand that all or some of the steps of embodiments may be implemented by hardware or a program instructing related hardware. The program may be stored in a computer-readable storage medium. The storage medium may include a read-only memory, a magnetic disk, or an optical disc.

The foregoing descriptions are merely optional embodiments of this application, but are not intended to limit this application. Any modification, equivalent replacement, or improvement made without departing from the spirit and principle of this application shall fall within the protection scope of this application.

What is claimed is:

1. A gesture instruction execution method, wherein the method comprises:

obtaining a plurality of gesture instructions acting on different areas of a target screen, wherein the obtaining a plurality of gesture instructions acting on different areas of a target screen comprises obtaining the plurality of gesture instructions that act on the different areas of the target screen at the same time;

obtaining an operation area on the target screen corresponding to each of the obtained plurality of gesture instructions;

determining, based on the operation area on the target screen corresponding to each of the plurality of gesture instructions and screen ranges to which a plurality of applications on the target screen belong, a target application corresponding to each gesture instruction, wherein each gesture instruction corresponds to a different target application;

controlling, based on instruction content of each gesture instruction, the target application corresponding to each gesture instruction, wherein controlling the target application corresponding to each gesture instruction comprises displaying a plurality of windows according of the plurality of gesture instructions on the target screen, wherein each of the plurality of windows corresponds to a respective target application of the each gesture instruction, wherein the target screen is a central control screen of a control domain cockpit, and wherein the different areas of the target screen comprise a first area on a driver side of the central control screen and a second area on a front passenger side of the central control screen, and wherein a first window for a first application is displayed on the second area on the front passenger side with a larger preconfigured window size than a second window for a second application that is displayed on the first area on the driver side, and wherein a received driver side gesture instruction controls a change of display of the second application in the first area but not on the second area, wherein a received passenger side gesture instruction controls a change of display of the first application in the second area but not on the first area;

storing window ranges of the plurality of applications in an open state in a stack, wherein a screen range to which each application of the plurality of applications belongs comprises a window range of the respective application in the open state; and performing stack management on the window range of each of the plurality of applications in the open state by using the stack, wherein performing stack management comprises:

moving a window object of the second application to a free multi-window stack in a multi-window stack manager;

assigning a value to the window object of the second application in the free multi-window stack; and updating a window range in the window object of the second application to a preconfigured window range, wherein the window range comprises a window size and a window location.

2. The method according to claim 1, wherein a screen range to which each application of the plurality of applications belongs comprises at least one of a range covered by an icon of the application or a window range of the application in an open state.

3. The method according to claim 1, wherein the determining, based on the operation area on the target screen corresponding to each of the plurality of gesture instructions and screen ranges to which a plurality of applications on the target screen belong, a target application corresponding to each gesture instruction comprises:

determining, based on the operation area on the target screen corresponding to each of the plurality of gesture instructions and the screen ranges to which the plurality of applications on the target screen belong, target applications respectively corresponding to the plurality of gesture instructions.

4. The method according to claim 1, wherein the controlling, based on instruction content of each gesture instruction, the target application corresponding to each gesture instruction comprises:

controlling, at the same time based on the instruction content of each gesture instruction, target applications respectively corresponding to the plurality of gesture instructions.

5. The method according to claim 1, wherein the gesture instruction comprises a touch gesture instruction.

6. The method according to claim 1, wherein the window range of the application in the open state is a preconfigured window range.

7. The method according to claim 1, wherein the window range of the application in the open state is a window range to which each application belongs when the application exits last time.

8. A gesture instruction execution apparatus, wherein the apparatus comprises:

at least one processor; and one or more memories coupled to the at least one processor and storing programming instructions for execution by the at least one processor to cause the apparatus to:

obtain a plurality of gesture instructions that act on different areas of a target screen, wherein the obtain a plurality of gesture instructions acting on different areas of a target screen comprises obtain the plurality of gesture instructions that act on the different areas of the target screen at the same time;

obtain an operation area on the target screen that corresponds to each of the plurality of gesture instructions; and determine, based on the operation area on the target screen corresponding to each of the plurality of gesture instructions and screen ranges to which a plurality of applications on the target screen belong, a target application corresponding to each gesture instruction, wherein each gesture instruction corresponds to a different target application;

control, based on instruction content of each gesture instruction, the target application corresponding to each gesture instruction, wherein the control the target application corresponding to each gesture instruction comprises display a plurality of windows according of the plurality of gesture instructions on the target screen, wherein each of the plurality of windows corresponds to a respective target application of the each gesture instruction, wherein the target screen is a central control screen of a control domain cockpit, and wherein the different areas of the target screen comprise a first area on a driver side of the central control screen and a second area on a front passenger side of the central control screen, and wherein a first window for a first application is displayed on the second area on the front passenger side with a larger preconfigured window size than a second window for a second application that is displayed on the first area on the driver side, and wherein a received driver side gesture instruction controls a change of display of the second application in the first area but not on the second area, wherein a received passenger side gesture instruction controls a change of display of the first application in the second area but not on the first area;

store window ranges of the plurality of applications in an open state in a stack, wherein a screen range to which each application of the plurality of applications belongs comprises a window range of the respective application in the open state; and perform stack management on the window range of each of the plurality of applications in the open state by using the stack, wherein perform stack management comprises:

move a window object of the second application to a free multi-window stack in a multi-window stack manager;

assign a value to the window object of the second application in the free multi-window stack; and update a window range in the window object of the second application to a preconfigured window range, wherein the window range comprises a window size and a window location.

9. The apparatus according to claim 8, wherein the programming instructions, when executed by the at least one processor, cause the apparatus to determine, based on the operation area on the target screen corresponding to each of the plurality of gesture instructions and the screen ranges to which the plurality of applications on the target screen belong, target applications respectively corresponding to the plurality of gesture instructions.

10. The apparatus according to claim 8, wherein the programming instructions, when executed by the at least one processor, cause the apparatus to control, at the same time based on the instruction content of each gesture instruction, target applications respectively corresponding to the plurality of gesture instructions.

11. The apparatus according to claim 8, wherein the gesture instruction comprises a touch gesture instruction.

12. A gesture control system, wherein the gesture control system comprises at least one processor and a target screen, and the at least one processor is configured to execute instructions to cause the gesture control system to:

obtain a plurality of gesture instructions acting on different areas of a target screen, wherein the obtain a plurality of gesture instructions acting on different areas of a target screen comprises obtain the plurality of gesture instructions that act on the different areas of the target screen at the same time;

obtain an operation area on the target screen corresponding to each of the obtained plurality of gesture instructions;

determine, based on the operation area on the target screen corresponding to each of the plurality of gesture instructions and screen ranges to which a plurality of applications on the target screen belong, a target application corresponding to each gesture instruction, wherein each gesture instruction corresponds to a different target application;

control, based on instruction content of each gesture instruction, the target application corresponding to each gesture instruction, wherein the control the target application corresponding to each gesture instruction comprises display a plurality of windows according of the plurality of gesture instructions on the target screen, wherein each of the plurality of windows corresponds to a respective target application of the each gesture instruction, wherein the target screen is a central control screen of a control domain cockpit, and wherein the different areas of the target screen comprise a first area on a driver side of the central control screen and a second area on a front passenger side of the central control screen, and wherein a first window for a first application is displayed on the second area on the front passenger side with a larger preconfigured window size than a second window for a second application that is displayed on the first area on the driver side, and wherein a received driver side gesture instruction controls a change of display of the second application in the first area but not on the second area, wherein a received passenger side gesture instruction controls a change of display of the first application in the second area but not on the first area;

store window ranges of the plurality of applications in an open state in a stack, wherein a screen range to which each application of the plurality of applications belongs comprises a window range of the respective application in the open state; and perform stack management on the window range of each of the plurality of applications in the open state by using the stack, wherein perform stack management comprises:

move a window object of the second application to a free multi-window stack in a multi-window stack manager;

assign a value to the window object of the second application in the free multi-window stack; and update a window range in the window object of the second application to a preconfigured window range, wherein the window range comprises a window size and a window location.

13. The gesture control system according to claim 12, wherein the determine, based on the operation area on the target screen corresponding to each of the plurality of gesture instructions and screen ranges to which a plurality of applications on the target screen belong, a target application corresponding to each gesture instruction comprises:

determine, based on the operation area on the target screen corresponding to each of the plurality of gesture instructions and the screen ranges to which the plurality of applications on the target screen belong, target applications respectively corresponding to the plurality of gesture instructions.

14. The gesture control system according to claim 12, wherein the control, based on instruction content of each gesture instruction, the target application corresponding to each gesture instruction comprises:

control, at the same time based on the instruction content of each gesture instruction, target applications respectively corresponding to the plurality of gesture instructions.

15. The gesture control system according to claim 12, wherein the gesture instruction comprises a touch gesture instruction.

16. A non-transitory computer-readable storage medium, wherein the storage medium stores at least one instruction, that when executed by at least one processor, causes a computer to:

obtain a plurality of gesture instructions acting on different areas of a target screen, wherein the obtain a plurality of gesture instructions acting on different areas of a target screen comprises obtain the plurality of gesture instructions that act on the different areas of the target screen at the same time;

obtain an operation area on the target screen corresponding to each of the obtained plurality of gesture instructions, wherein each gesture instruction corresponds to a different target application;

determine, based on the operation area on the target screen corresponding to each of the plurality of gesture instructions and screen ranges to which a plurality of applications on the target screen belong, a target application corresponding to each gesture instruction;

control, based on instruction content of each gesture instruction, the target application corresponding to each gesture instruction, wherein the control the target application corresponding to each gesture instruction comprises display a plurality of windows according of the plurality of gesture instructions on the target screen, wherein each of the plurality of windows corresponds to a respective target application of the each gesture instruction, wherein the target screen is a central control screen of a control domain cockpit, and wherein the different areas of the target screen comprise a first area on a driver side of the central control screen and a second area on a front passenger side of the central control screen, and wherein a first window for a first application is displayed on the second area on the front passenger side with a larger preconfigured window size than a second window for a second application that is displayed on the first area on the driver side, and wherein a received driver side gesture instruction controls a change of display of the second application in the first area but not on the second area, wherein a received passenger side gesture instruction controls a change of display of the first application in the second area but not on the first area;

store window ranges of the plurality of applications in an open state in a stack, wherein a screen range to which each application of the plurality of applications belongs comprises a window range of the respective application in the open state; and perform stack management on the window range of each of the plurality of applications in the open state by using the stack, wherein perform stack management comprises:

move a window object of the second application to a free multi-window stack in a multi-window stack manager;

assign a value to the window object of the second application in the free multi-window stack; and update a window range in the window object of the second application to a preconfigured window range, wherein the window range comprises a window size and a window location.

17. The non-transitory computer-readable storage medium according to claim 16, wherein a screen range to which each application of the plurality of applications belongs comprises at least one of a range covered by an icon of the application or a window range of the application in an open state.

18. The non-transitory computer-readable storage medium according to claim 16, wherein the determine, based on the operation area on the target screen corresponding to each of the plurality of gesture instructions and screen ranges to which a plurality of applications on the target screen belong, a target application corresponding to each gesture instruction comprises:

determine, based on the operation area on the target screen corresponding to each of the plurality of gesture instructions and the screen ranges to which the plurality of applications on the target screen belong, target applications respectively corresponding to the plurality of gesture instructions.

19. The non-transitory computer-readable storage medium according to claim 16, wherein the control, based on instruction content of each gesture instruction, the target application corresponding to each gesture instruction comprises:

control, at the same time based on the instruction content of each gesture instruction, target applications respectively corresponding to the plurality of gesture instructions.

20. The non-transitory computer-readable storage medium according to claim 16, wherein the gesture instruction comprises a touch gesture instruction.

* * * * *